United States Patent
Ben-Avi et al.

(10) Patent No.: US 12,072,971 B2
(45) Date of Patent: Aug. 27, 2024

(54) SECURE DEBUGGING

(71) Applicant: Mobileye Vision Technologies Ltd., Jerusalem (IL)

(72) Inventors: Eran Ben-Avi, Haifa (IL); Leonid Smolyansky, Zichron Ya'akov (IL)

(73) Assignee: Mobileye Vision Technologies Ltd., Jerusalem (IL)

( * ) Notice: Subject to any disclaimer, the term of this patent is extended or adjusted under 35 U.S.C. 154(b) by 381 days.

(21) Appl. No.: 17/500,279

(22) Filed: Oct. 13, 2021

(65) Prior Publication Data

US 2022/0114261 A1 Apr. 14, 2022

Related U.S. Application Data

(60) Provisional application No. 63/091,586, filed on Oct. 14, 2020.

(51) Int. Cl.
*G06F 21/85* (2013.01)
*G06F 21/51* (2013.01)
*B60W 50/00* (2006.01)

(52) U.S. Cl.
CPC .......... *G06F 21/51* (2013.01); *G06F 21/85* (2013.01); *B60W 50/00* (2013.01);
(Continued)

(58) Field of Classification Search
CPC .... G06F 21/51; G06F 21/85; G06F 2221/034; G06F 2221/2143
See application file for complete search history.

(56) References Cited

U.S. PATENT DOCUMENTS 11,280,829 B1 * 3/2022 Poolla ............... G01R 31/3177
2007/0271461 A1 * 11/2007 Hardy ............ G01R 31/31705
713/176
(Continued)

FOREIGN PATENT DOCUMENTS

CN 111026363 4/2020
CN 114359858 4/2022
(Continued)

OTHER PUBLICATIONS

"Taiwanese Application Serial No. 110138168, Office Action mailed May 4, 2023", w English Translation, 8 pgs.

*Primary Examiner* — David J Pearson
(74) *Attorney, Agent, or Firm* — Schwegman Lundberg & Woessner, P.A.

(57) ABSTRACT

Disclosed embodiments provide systems and methods that can be used as part of or in combination with autonomous navigation, autonomous driving, or driver assist technology features. As opposed to fully autonomous driving, driver assist technology may refer to any suitable technology to assist drivers in the navigation or control of their vehicles. In various embodiments, the system may include one or more cameras mountable in a vehicle and an associated processor that monitors the environment of the vehicle. In further embodiments, additional types of sensors can be mounted in the vehicle and can be used in the autonomous navigation or driver assist systems. These systems and methods may include the use of a shared cache that is shared by a group of processing units to improve analysis of images captured by the one or more cameras.

21 Claims, 18 Drawing Sheets

(52) U.S. Cl.
CPC ............... *B60W 2050/0083* (2013.01); *B60W 2420/403* (2013.01); *G06F 2221/034* (2013.01); *G06F 2221/2143* (2013.01)

(56) References Cited

U.S. PATENT DOCUMENTS

| | | | | |
|---|---|---|---|---|
| 2010/0217964 | A1* | 8/2010 | Peterka | G01R 31/31719 |
| | | | | 713/185 |
| 2014/0344919 | A1* | 11/2014 | Wu | G06F 21/74 |
| | | | | 726/17 |
| 2015/0161408 | A1* | 6/2015 | Shanbhogue | G06F 11/3656 |
| | | | | 726/27 |
| 2021/0256164 | A1* | 8/2021 | Loisel | H04L 9/0819 |
| 2021/0365557 | A1* | 11/2021 | Chokshi | G06F 11/3648 |

FOREIGN PATENT DOCUMENTS

| | | |
|---|---|---|
| DE | 102021126662 | 4/2022 |
| TW | 201044268 | 12/2010 |
| TW | 202221544 | 6/2022 |
| WO | WO-2020002441 A1 * | 1/2020 |

\* cited by examiner

SECURE DEBUGGING

PRIORITY

This application claims the benefit of priority to U.S. Provisional Patent Application Ser. No. 63/091,586, filed Oct. 14, 2020, which is incorporated by reference herein in its entirety.

BACKGROUND

Advanced driver assistance systems (ADAS), and autonomous vehicle (AV) systems use cameras and other sensors together with object classifiers to detect specific objects in an environment of a vehicle navigating a road. Object classifiers are designed to detect predefined objects and are used within ADAS and AV systems, and may be used to control the vehicle or alert a driver based on the detected object type or object location. As ADAS and AV systems progress towards fully autonomous operation, it would be beneficial to protect data generated by these systems.

SUMMARY

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples.

Disclosed embodiments provide systems and methods that can be used as part of or in combination with autonomous navigation, autonomous driving, or driver assist technology features. As opposed to fully autonomous driving, driver assist technology may refer to any suitable technology to assist drivers in the navigation or control of their vehicles. Examples of driver assist technology include Forward Collision Warning (FCW), Lane Departure Warning (LDW), Traffic Sign Recognition (TSR), and other driver assist technologies. In various embodiments, the system may include one, two, or more cameras mountable in a vehicle and an associated processor that monitors the environment of the vehicle. In further embodiments, additional types of sensors can be mounted in the vehicle and can be used in the autonomous navigation or driver assist systems. In some examples of the presently disclosed subject matter, the system may provide techniques for processing images of an environment in advance of a vehicle navigating a road, where the processing including training neural networks or deep learning algorithms to estimate a future path of a vehicle based on images. In yet further examples of the presently disclosed subject matter, the system may provide techniques for processing images of an environment in advance of a vehicle navigating a road using a trained neural network to estimate a future path of the vehicle.

There are provided systems and methods, as illustrated in the claims and the specification. Any combination of any subject matter of any claim may be provided. Any combination of any method or method step disclosed in any figure or in the specification may be provided. Any combination of any unit, device, or component disclosed in any figure or in the specification may be provided. Non-limiting examples of such units include a gather unit, an image processor, and the like.

BRIEF DESCRIPTION OF THE DRAWINGS

The subject matter regarded as the subject matter is particularly pointed out and distinctly claimed in the concluding portion of the specification. The subject matter, however, both as to organization and method of operation, together with objects, features, and advantages thereof, may best be understood by reference to the following detailed description when read with the accompanying drawings in which:

DETAILED DESCRIPTION OF THE DRAWINGS

Figure 1:
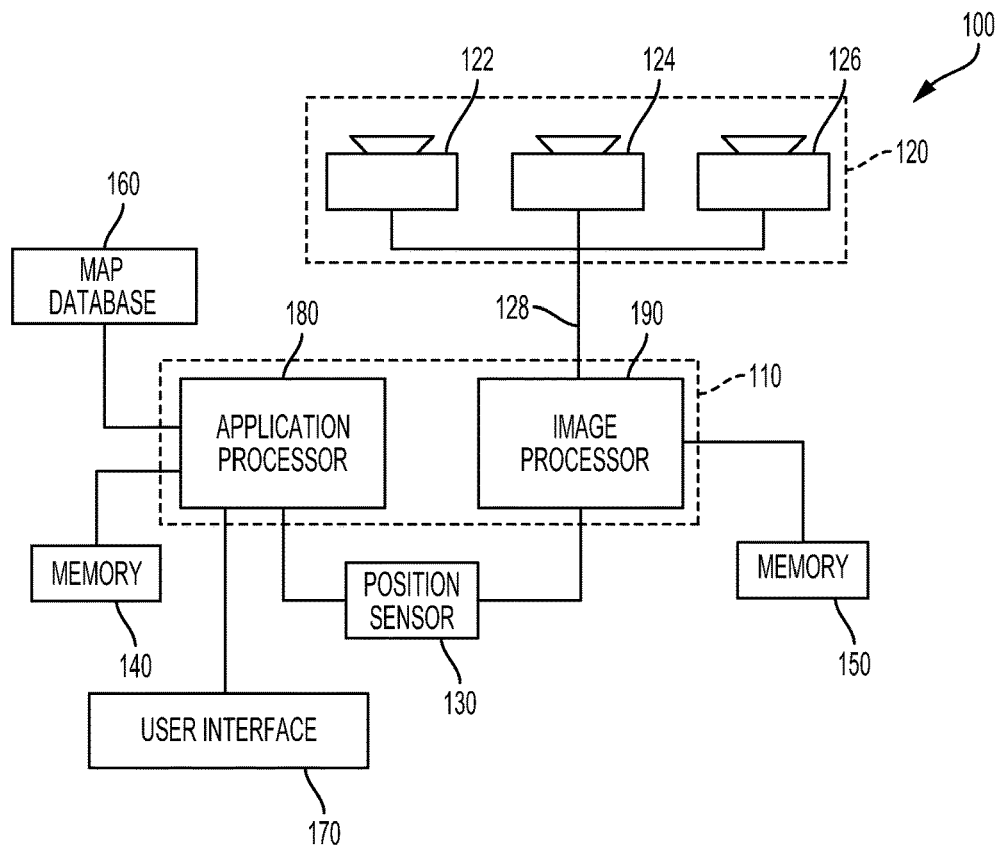
FIG. 1 is a block diagram representation of a system consistent with the disclosed embodiments.

In the following detailed description, numerous specific details are set forth in order to provide a thorough understanding of the subject matter. However, it will be understood by those skilled in the art that the present subject matter may be practiced without these specific details. In other instances, well-known methods, procedures, and components have not been described in detail so as not to obscure the present subject matter.

The subject matter regarded as the subject matter is particularly pointed out and distinctly claimed in the concluding portion of the specification. The subject matter, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present subject matter may, for the most part, be implemented using electronic components and circuits known to those skilled in the art, details will not be explained in any greater extent than that considered necessary as illustrated above, for the understanding and appreciation of the underlying concepts of the present subject matter and in order not to obfuscate or distract from the teachings of the present subject matter.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system and any other component should be applied mutatis mutandis to a method that may be executed by the memory device and should be applied mutatis mutandis to a non-transitory computer readable medium that stores instructions that may be executed by the memory device. For example, there may be provided a method or method steps executed by the image processor, or there may be provided a method or method steps executed by the image processor.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Any combination of any module or unit listed in any of the figures, or any part of the specification or any claims may be provided. Particularly, any combination of any claimed feature may be provided.

Before discussing examples in detail, such as examples of features of the processing images of an environment in advance of a vehicle navigating a road for training a neural networks or deep learning algorithms to estimate a future path of a vehicle based on images or feature of the processing of images of an environment in advance of a vehicle navigating a road using a trained neural network to estimate a future path of the vehicle, there is provided a description of various possible implementations and configurations of a vehicle mountable system that can be used for carrying out and implementing the methods according to examples of the presently disclosed subject matter. In some embodiments, various examples of the system can be mounted in a vehicle, and can be operated while the vehicle is in motion. In some embodiments, the system can implement the methods according to examples of the presently disclosed subject matter.

However, it would be appreciated that embodiments of the present disclosure are not limited to scenarios where a suspected upright object indication is caused by a high-grade road. The suspected upright object indication can be associated with various other circumstances, and can result from other types of image data or from data that is not image-based or is not exclusively image-based.

FIG. 1, to which reference is now made, is a block diagram representation of a system consistent with the disclosed embodiments. System 100 can include various components depending on the requirements of a particular implementation. In some examples, system 100 can include a processing unit 110, an image acquisition unit 120, and one or more memory units 140, 150. Processing unit 110 can include one or more processing devices. In some embodiments, processing unit 110 can include an application processor 180, an image processor 190, or any other suitable processing device. Similarly, image acquisition unit 120 can include any number of image acquisition devices and components depending on the requirements of a particular application. In some embodiments, image acquisition unit 120 can include one or more image capture devices (e.g., cameras), such as image capture device 122, image capture device 124, and image capture device 126. In some embodiments, system 100 can also include a data interface 128 communicatively connecting processing unit 110 to image acquisition device 120. For example, data interface 128 can include any wired or wireless link or links for transmitting image data acquired by image acquisition device 120 to processing unit 110.

Both application processor 180 and image processor 190 can include various types of processing devices. For example, either or both of application processor 180 and image processor 190 can include one or more microprocessors, preprocessors (such as image preprocessors), graphics processors, central processing units (CPUs), support circuits, digital signal processors, integrated circuits, memory, or any other types of devices suitable for running applications and for image processing and analysis. In some embodiments, application processor 180 or image processor 190 can include any type of single or multi-core processor, mobile device microcontroller, central processing unit, or other type of processor. Various processing devices can be used, for example including processors available from manufacturers (e.g., Intel®, AMD®, etc.), and can include various architectures (e.g., x86 processor, ARM®, etc.).

In some embodiments, application processor 180 or image processor 190 can include any of the EyeQ series of processor chips available from Mobileye®. These processor designs each include multiple processing units with local memory and instruction sets. Such processors may include video inputs for receiving image data from multiple image sensors, and may also include video out capabilities. In one example, the EyeQ2® uses 90 nm-micron technology operating at 332 Mhz. The EyeQ2® architecture has two floating point, hyper-thread 32-bit RISC CPUs (MIPS32® 34K® cores), five Vision Computing Engines (VCE), three Vector Microcode Processors (VMP®), Denali 64-bit Mobile DDR Controller, 128-bit internal Sonics Interconnect, dual 16-bit Video input and 18-bit Video output controllers, 16 channels DMA and several peripherals. The MIPS34K CPU manages the five VCEs, three VMP™ the DMA, the second MIPS34K CPU, the multi-channel DMA, and the other peripherals. The five VCEs, three VMP® and the MIPS34K CPU can perform intensive vision computations required by multi-function bundle applications. In another example, the EyeQ3®, which is a third-generation processor and is six times more powerful that the EyeQ2®, may be used in the disclosed examples. In yet another example, the EyeQ4®, the fourth-generation processor, may be used in the disclosed examples.

While FIG. 1 depicts two separate processing devices included in processing unit 110, more or fewer processing devices can be used. For example, in some examples, a single processing device may be used to accomplish the tasks of application processor 180 and image processor 190. In other embodiments, these tasks can be performed by more than two processing devices.

Processing unit 110 can include various types of devices. For example, processing unit 110 may include various devices, such as a controller, an image preprocessor, a central processing unit (CPU), support circuits, digital signal processors, integrated circuits, memory, or any other types of devices for image processing and analysis. The image preprocessor can include a video processor for capturing, digitizing, and processing the imagery from the image sensors. The CPU can include any number of microcontrollers or microprocessors. The support circuits can be any number of circuits generally well known in the art, including cache, power supply, clock, and input-output circuits. The memory can store software that, when executed by the processor, controls the operation of the system. The memory can include databases and image processing software, including a trained system, such as a neural network, for example. The memory can include any number of random access memories (RAM), read only memories (ROM), flash memories, disk drives, optical storage, removable storage, and other types of storage. In one instance, the memory can be separate from the processing unit 110. In another instance, the memory can be integrated into the processing unit 110.

Each memory 140, 150 can include software instructions that, when executed by a processor (e.g., application processor 180 or image processor 190), can control operation of various aspects of system 100. These memory units can include various databases and image processing software. The memory units can include random access memory, read only memory, flash memory, disk drives, optical storage, tape storage, removable storage, or any other types of storage. In some examples, memory units 140, 150 can be separate from the application processor 180 or image processor 190. In other embodiments, these memory units can be integrated into application processor 180 or image processor 190.

In some embodiments, the system can include a position sensor 130. The position sensor 130 can include any type of device suitable for determining a location associated with at least one component of system 100. In some embodiments, position sensor 130 can include a global positioning system (GPS) receiver. Such receivers can determine a user position and velocity by processing signals broadcasted by GPS satellites. Position information from position sensor 130 can be made available to application processor 180 or image processor 190.

In some embodiments, the system 100 can be operatively connectible to various systems, devices, and units onboard a vehicle in which the system 100 can be mounted, and through any suitable interfaces (e.g., a communication bus) the system 100 can communicate with the vehicle's systems. Examples of vehicle systems with which the system 100 can cooperate include a throttling system, a braking system, and a steering system.

In some embodiments, the system 100 can include a user interface 170. User interface 170 can include any device suitable for providing information to or for receiving inputs from one or more users of system 100, for example including a touchscreen, microphone, keyboard, pointer devices, track wheels, cameras, knobs, buttons, etc. Information can be provided by the system 100, through the user interface 170, to the user.

In some embodiments, the system 100 can include a map database 160. The map database 160 can include any type of database for storing digital map data. In some examples, map database 160 can include data relating to a position, in a reference coordinate system, of various items, including roads, water features, geographic features, points of interest, etc. Map database 160 can store not only the locations of such items, but also descriptors relating to those items, for example including names and other information associated with any of the stored features. For example, the database may include locations and types of known obstacles, information about a topography of a road or a grade of certain points along a road, etc. In some embodiments, map database 160 can be physically located with other components of system 100. Alternatively, or additionally, map database 160 or a portion thereof can be located remotely with respect to other components of system 100 (e.g., processing unit 110). In such remote embodiments, information from map database 160 can be downloaded over a wired or wireless data connection to a network (e.g., over a cellular network or the Internet, etc.).

Image capture devices 122, 124, and 126 can each include any type of device suitable for capturing at least one image from an environment. Moreover, any number of image capture devices can be used to acquire images for input to the image processor. Some examples of the presently disclosed subject matter can include or can be implemented with only a single-image capture device, while other examples can include or can be implemented with two, three, four, or more image capture devices. Image capture devices 122, 124, and 126 will be further described with reference to FIGS. 2B-2E, below.

It would be appreciated that the system 100 can include or can be operatively associated with other types of sensors, for example including an acoustic sensor, a RF sensor (e.g., radar transceiver), a LIDAR sensor, or other sensors. Such sensors can be used independently of or in cooperation with the image acquisition device 120. For example, data from a radar system (not shown) can be used for validating the processed information that is received from processing images acquired by the image acquisition device 120, such as to filter certain false positives resulting from processing images acquired by the image acquisition device 120. Data from a radar system can also be combined with or otherwise compliment the image data from the image acquisition device 120, or be combined with some processed variation or derivative of the image data from the image acquisition device 120.

Figure 2A:
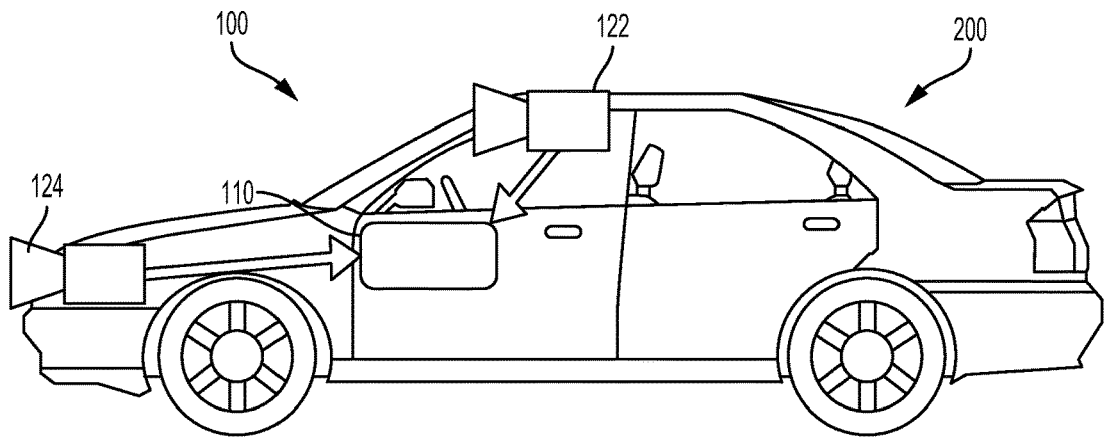
FIG. 2A is a diagrammatic side view representation of an exemplary vehicle including a system consistent with the disclosed embodiments.

System 100, or various components thereof, can be incorporated into various different platforms. In some embodiments, system 100 may be included on a vehicle 200, as shown in FIG. 2A. For example, vehicle 200 can be equipped with a processing unit 110 and any of the other components of system 100, as described above relative to FIG. 1. While in some embodiments vehicle 200 can be equipped with only a single-image capture device (e.g., camera), in other embodiments multiple image capture devices can be used, such as those discussed in connection with FIGS. 2B-2E. For example, either of image capture devices 122 or 124 of vehicle 200, as shown in FIG. 2A, can be part of an ADAS (Advanced Driver Assistance Systems) imaging set.

The image capture devices included on vehicle 200 as part of the image acquisition unit 120 can be positioned at any suitable location. In some embodiments, as shown in FIGS. 2A-2E and 3, image capture device 122 can be located in the vicinity of the rearview mirror. This position may provide a line of sight similar to that of the driver of vehicle 200, which can aid in determining what is and is not visible to the driver.

Other locations for the image capture devices of image acquisition unit 120 can also be used. For example, image capture device 124 can be located on or in a bumper of vehicle 200. Such a location can be especially suitable for image capture devices having a wide field of view. The line of sight of bumper-located image capture devices can be different from that of the driver. The image capture devices (e.g., image capture devices 122, 124, and 126) can also be located in other locations. For example, the image capture devices may be located on or in one or both of the side mirrors of vehicle 200, on the roof of vehicle 200, on the hood of vehicle 200, on the trunk of vehicle 200, on the sides of vehicle 200, mounted on, positioned behind, or positioned in front of any of the windows of vehicle 200, and mounted in or near vehicle lights on the front or back of vehicle 200, or in other locations. The image capture unit 120, or an image capture device that is one of a plurality of image capture devices that are used in an image capture unit 120, can have a field-of-view (FOV) that is different than the FOV of a driver of a vehicle, and not always see the same objects. In one example, the FOV of the image acquisition unit 120 can extend beyond the FOV of a typical driver and can thus image objects which are outside the FOV of the driver. In yet another example, the FOV of the image acquisition unit 120 is some portion of the FOV of the driver. In some embodiments, the FOV of the image acquisition unit 120 corresponding to a sector which covers an area of a road in advance of a vehicle and possibly also surroundings of the road.

In addition to image capture devices, vehicle 200 can be include various other components of system 100. For example, processing unit 110 may be included on vehicle 200 either integrated with or separate from an engine control unit (ECU) of the vehicle. Vehicle 200 may also be equipped with a position sensor 130, such as a GPS receiver, and may also include a map database 160 and memory units 140 and 150.

Figure 2B:
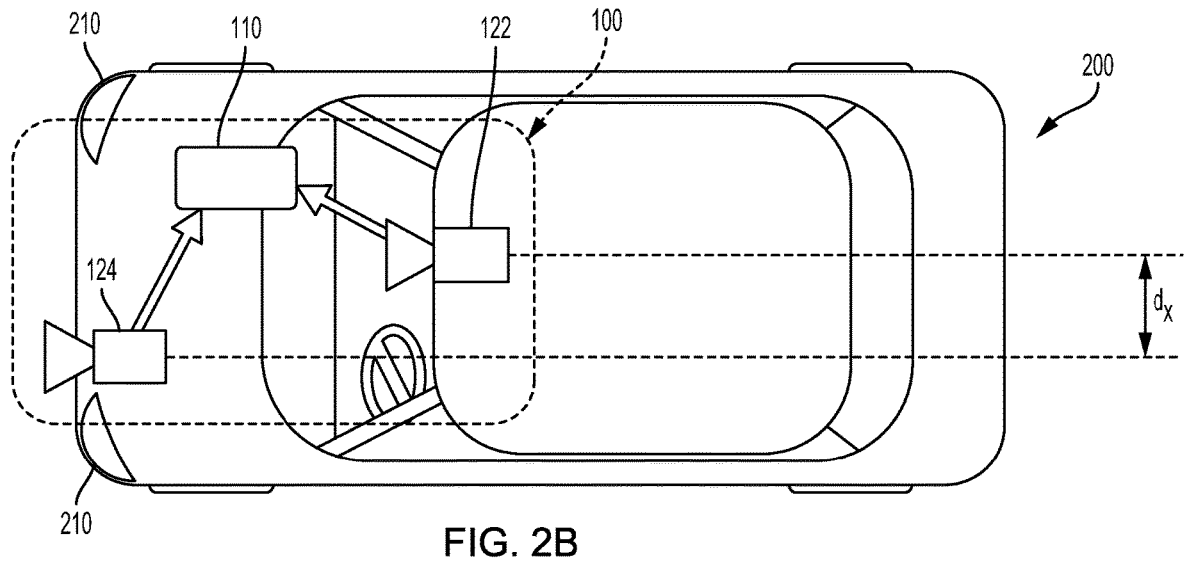
FIG. 2B is a diagrammatic top view representation of the vehicle and system shown in FIG. 2A consistent with the disclosed embodiments.

FIG. 2A is a diagrammatic side view representation of a vehicle imaging system according to examples of the presently disclosed subject matter. FIG. 2B is a diagrammatic top view illustration of the example shown in FIG. 2A. As illustrated in FIG. 2B, the disclosed examples can include a system 100 within a vehicle 200. The system 100 may include a first image capture device 122 positioned in the vicinity of the rearview mirror or near the driver of vehicle 200, a second image capture device 124 positioned on or in a bumper region (e.g., one of bumper regions 210) of vehicle 200, and a processing unit 110.

Figure 2C:
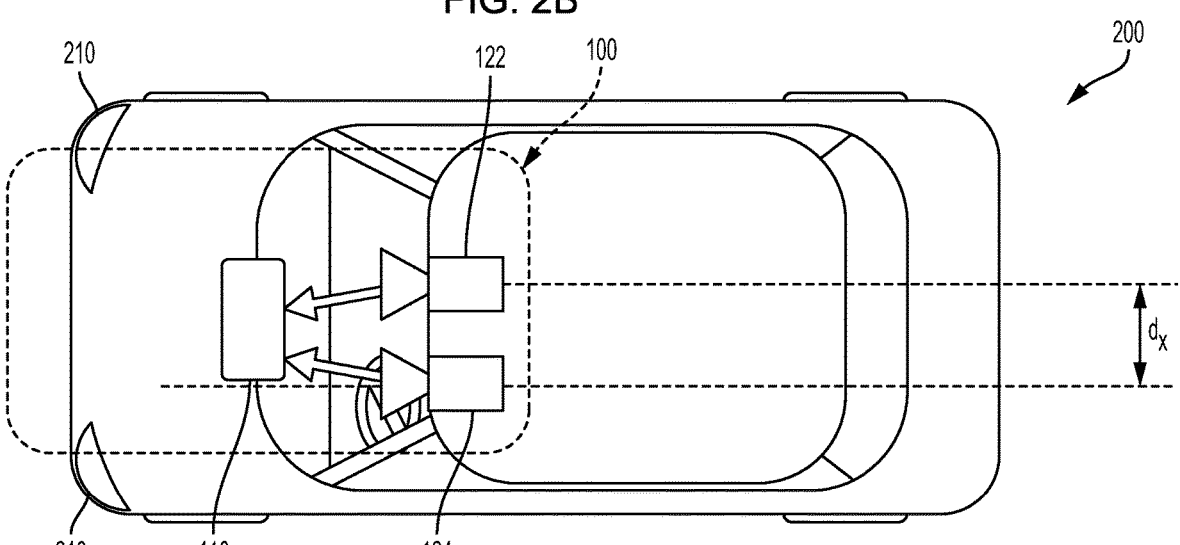
FIG. 2C is a diagrammatic top view representation of another embodiment of a vehicle including a system consistent with the disclosed embodiments.

As illustrated in FIG. 2C, image capture devices 122 and 124 may both be positioned in the vicinity of the rearview mirror or near the driver of vehicle 200. Additionally, while two image capture devices 122 and 124 are shown in FIGS. 2B and 2C, it should be understood that other embodiments may include more than two image capture devices. For example, in the embodiment shown in FIG. 2D, system 100 of vehicle 200 includes a first image capture device 122, a second image capture device 124, and a third image capture device 126.

Figure 2D:
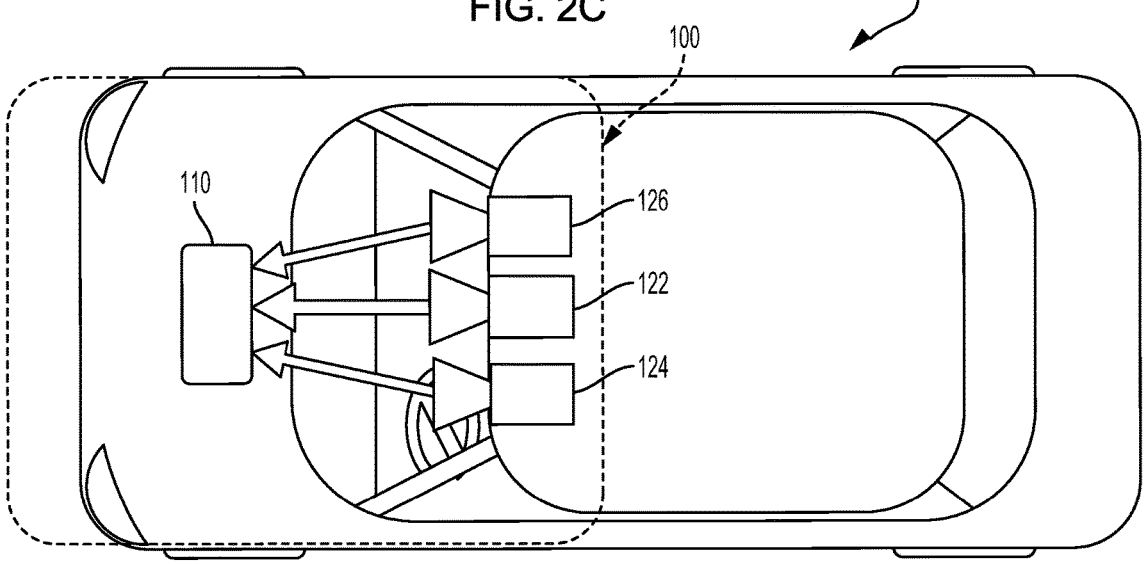
FIG. 2D is a diagrammatic top view representation of yet another embodiment of a vehicle including a system consistent with the disclosed embodiments.

As shown in FIG. 2D, image capture devices 122, 124, and 126 may be positioned in the vicinity of the rearview mirror or near the driver seat of vehicle 200. The disclosed examples are not limited to any particular number and configuration of the image capture devices, and the image capture devices may be positioned in any appropriate location within or on vehicle 200. It is also to be understood that disclosed embodiments are not limited to a particular type of vehicle 200 and may be applicable to all types of vehicles including automobiles, trucks, trailers, motorcycles, bicycles, self-balancing transport devices and other types of vehicles.

The first image capture device 122 can include any suitable type of image capture device. Image capture device 122 can include an optical axis. In one instance, the image capture device 122 can include an Aptina M9V024 WVGA sensor with a global shutter. In another example, a rolling shutter sensor can be used. Image acquisition unit 120, and any image capture device which is implemented as part of the image acquisition unit 120, can have any desired image resolution. For example, image capture device 122 can provide a resolution of 1280×960 pixels and can include a rolling shutter. As used herein, a pixel may include a picture element obtained by a camera, or may include a processed picture element.

Image acquisition unit 120, and any image capture device that is implemented as part of the image acquisition unit 120, can include various optical elements. In some embodiments, one or more lenses can be included, such as to provide a desired focal length and field of view for the image acquisition unit 120. These lenses may be used for any image capture device that is implemented as part of the image acquisition unit 120. In some examples, an image capture device that is implemented as part of the image acquisition unit 120 can include or can be associated with any optical elements, such as a 6 mm lens or a 12 mm lens. In some examples, image capture device 122 can be configured to capture images having a desired and known FOV.

The first image capture device 122 may have a scan rate associated with acquisition of each of the first series of image scan lines. The scan rate may refer to a rate at which an image sensor can acquire image data associated with each pixel included in a particular scan line.

Figure 2E:
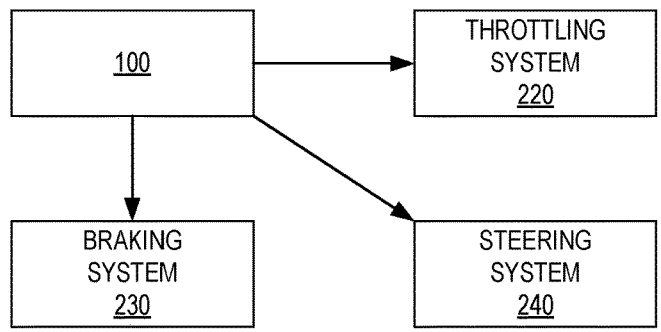
FIG. 2E is a diagrammatic representation of exemplary vehicle control systems consistent with the disclosed embodiments.

FIG. 2E is a diagrammatic representation of vehicle control systems, according to examples of the presently disclosed subject matter. As indicated in FIG. 2E, vehicle 200 can include throttling system 220, braking system 230, and steering system 240. System 100 can provide inputs (e.g., control signals) to one or more of throttling system 220, braking system 230, and steering system 240 over one or more data links (e.g., any wired or wireless link or links for transmitting data). For example, based on analysis of images acquired by image capture devices 122, 124, or 126, system 100 can provide control signals to one or more of throttling system 220, braking system 230, and steering system 240 to navigate vehicle 200 (e.g., by causing an acceleration, a turn, a lane shift, etc.). Further, system 100 can receive inputs from one or more of throttling system 220, braking system 230, and steering system 240 indicating operating conditions of vehicle 200 (e.g., speed, whether vehicle 200 is braking or turning, etc.).

Figure 3:
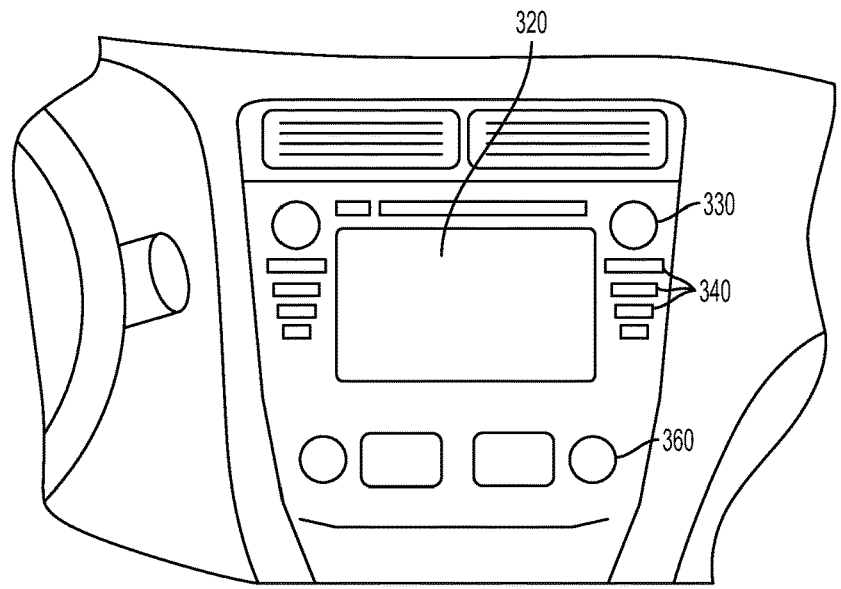
FIG. 3 is a diagrammatic representation of a user interface consistent with the disclosed embodiments.

FIG. 3 is a diagrammatic representation of a user interface 170 consistent with the disclosed embodiments. As shown in FIG. 3, vehicle 200 may also include a user interface 170 for interacting with a driver or a passenger of vehicle 200. The user interface 170 may include one or more sensors positioned near a rear-view mirror 310 or a console display 320. For example, user interface 170 in a vehicle application may include a touch screen display 320, knobs 330, buttons 340, and a microphone 350. A driver or passenger of vehicle 200 may also use handles (e.g., turn signal handles located on or near the steering column of vehicle 200 including), buttons (e.g., located on the steering wheel of vehicle 200), and the like, to interact with system 100. In some embodiments, a microphone 350 may be positioned adjacent to a rearview mirror 310. Similarly, in some embodiments, image capture device 122 may be located near rearview mirror 310. In some embodiments, user interface 170 may also include one or more speakers 360 (e.g., speakers of a vehicle audio system). For example, system 100 may provide various notifications (e.g., alerts) via speakers 360.

As will be appreciated by a person skilled in the art having the benefit of this disclosure, numerous variations or modifications may be made to the foregoing disclosed embodiments. For example, not all components are essential for the operation of system 100. Further, any component may be located in any appropriate part of system 100 and the components may be rearranged into a variety of configurations while providing the functionality of the disclosed embodiments. Therefore, the foregoing configurations are examples and, regardless of the configurations discussed above, system 100 can provide a wide range of functionality to analyze the surroundings of vehicle 200 and, in response to this analysis, navigate or otherwise control or operate vehicle 200. Navigation, control, or operation of vehicle 200 may include enabling or disabling (directly or via intermediary controllers, such as the controllers mentioned above) various features, components, devices, modes, systems, or subsystems associated with vehicle 200. Navigation, control, or operation may alternately or additionally include interaction with a user, driver, passenger, passerby, or other vehicle or user, which may be located inside or outside vehicle 200, for example by providing visual, audio, haptic, or other sensory alerts or indications.

As discussed below in further detail and consistent with various disclosed embodiments, system 100 may provide a variety of features related to autonomous driving, semi-autonomous driving or driver assist technology. For example, system 100 may analyze image data, position data (e.g., GPS location information), map data, speed data, or data from sensors included in vehicle 200. System 100 may collect the data for analysis from, for example, image acquisition unit 120, position sensor 130, and other sensors. Further, system 100 may analyze the collected data to determine whether or not vehicle 200 should take a certain action, and then automatically take the determined action without human intervention. It would be appreciated that in some cases, the actions taken automatically by the vehicle are under human supervision, and the ability of the human to intervene, adjust, abort, or override the machine action is enabled under certain circumstances or at all times. For example, when vehicle 200 navigates without human intervention, system 100 may automatically control the braking, acceleration, or steering of vehicle 200 (e.g., by sending control signals to one or more of throttling system 220, braking system 230, and steering system 240). Further, system 100 may analyze the collected data and issue warnings, indications, recommendations, alerts, or instructions to a driver, passenger, user, or other person inside or outside of the vehicle (or to other vehicles) based on the analysis of the collected data. Additional details regarding the various embodiments that are provided by system 100 are provided below. Any numerical value illustrated in the specification is a non-limiting example of a number value. Other values may be provided or used. Unless otherwise specified, the values may be lower than the value mentioned in the application or values that exceed the value mentioned in the application.

Access Control Mechanism in Cache Coherent Integrated Circuit

Integrated circuits, including integrated circuits included in AV or ADAS systems, may execute a variety of tasks in a highly efficient and secure manner. Such integrated circuit may include multiple processing units and multiple hardware accelerators. The processing units may be configured to execute multiple processing threads and to selectively share data between processing units or hardware accelerators.

The processing units may use a shared cache. Some of the hardware accelerators may also use shared cache for sharing parts of the program and data that need to be processed by more than one hardware accelerator (e.g., two, three, or more hardware accelerators). In addition, parts of the same data may be used by the hardware accelerators and the processing units, therefore a content stored in any of the shared caches may be accessible to hardware accelerators and processing units. The sharing enables the processing units to perform various parts of a program while sharing data related to or generated by an execution of the program.

The integrated circuit may include multiple communication modules that may receive data units from various peripherals or other initiators. A subset of the data units may be updated versions of older data units that are cached in the shared cache. There is a need to maintain cache coherency, such as to prevent a processing unit from using a cached data unit that is irrelevant. The cache coherency should be maintained while maintaining access control rules that limit the access of various initiators or processing units to various ranges of a memory space.

Access control rules may be provided to and subsequently enforced by each initiator or at each target. When there are many initiators and many processing units, the configuration and updating of the access control rules may become complex and time consuming. There is therefore a need to maintain cache coherency while controlling access in an efficient and secure manner. There may be provided an integrated circuit device, a method, and a non-transitory computer readable medium that enables access control enforcement and maintains cache integrity.

Figure 4:
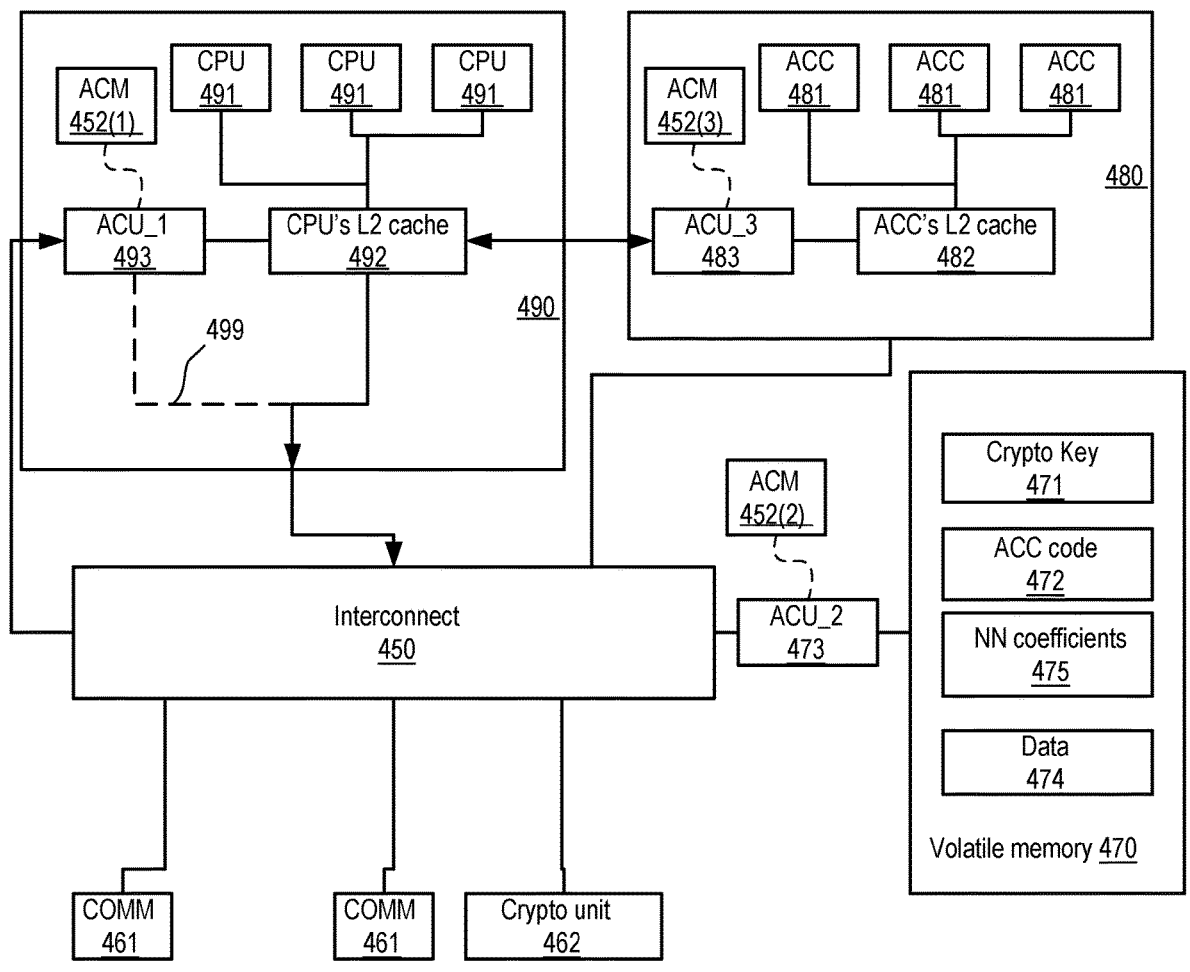
FIG. 4 illustrates an example of an integrated circuit.

FIG. 4 illustrates an example of an integrated circuit 400. Integrated circuit 400 may be included in processing unit 110. The integrated circuit may be a system on chip (SOC). The integrated circuit 400 may include:

a. A group of processing units such as central processing units (CPUs) 491.
b. A shard cache such as a level two (L2) cache of the CPU's (denoted "CPU's L2 cache") 492. Other level shared cache memory may be used.
c. A first access control unit (ACU_1) 493.
d. A second access control unit (ACU_2) 473.
e. A group of hardware accelerators (ACC) 481.
f. An additional shard cache such as a L2 cache of the ACC's (denoted "ACC's L2 cache") 482.
g. An interconnect 450.
h. A third access control unit (ACU_3) 473.
i. A volatile memory 470 that may store information or commands such as a cryptographic key ("crypto key") 471, a code of one or more of the hardware accelerators ("ACC code" 472), neural network coefficients ("NN coefficients" 475), and data 474. The volatile memory may be a DRAM memory unit.
j. A cryptographic unit ("crypto unit 462").
k. Communication modules ("COMM") 461. Different communication modules may be allocated to different communication protocols or to different initiators.

l. A first access control metadata (ACM) 452(1) that is accessible by the first ACU 493.
m. A second ACM 452(2) that is accessible to second ACU 473.
n. A third ACM 452(3) accessible to third ACU 483.

Each access control metadata (ACM) may define access rights of different initiators, of different access requests (e.g., read, write), and the like. The first, second, and third ACMs may be protected against tampering (e.g., hacking) in various manners. In an example, a tampering prevention measure may include applying access control rules that prevent access to the ACMs, where the access control rules may be written during a boot sequence of the integrated circuit.

The hardware accelerators 481 may be neural network processors, vector processors, dedicated image processing cores, programmable arrays of processing units, and the like. A hardware accelerator may be tailored to generate certain types of tasks in a manner that is more efficient than a general-purpose processing unit.

The shared cache memories may differ from level two (L2) caches. While L2 caches are shown, they may be caches of various levels, such as L3 or other caches. The allocation between processing units or hardware accelerators may differ from those illustrated in FIG. 4. In various examples, a subset of the processing units may share a shared cache, a subset of the hardware accelerators may share a shared cache, the shared cache and the additional shared cache may not be coupled to each other, there may be multiple interconnects between or among devices, the volatile memory may differ from a DRAM memory unit, there may be multiple volatile memory units, the integrated circuit may include one or more nonvolatile memory units, the crypto unit may be located elsewhere, there may be multiple crypto units, and the like.

The group of CPUs 491, the first ACU 493, and the CPU's L2 cache 492 may be included in a first portion 490 of the integrated circuit. The third ACU 483, the group of ACCs 481, and the ACC's L2 cache 482 may be included in a second portion 490 of the integrated circuit.

The interconnect 450 may be coupled to the first portion 490, the second portion 480, the crypto unit 462, the second ACU 473, and the communication modules 461. The interconnect 450 may be coupled, directly or indirectly, to initiators that initiate access requests. The initiators may include any circuit capable of initiating access requests. Examples of initiators include a sensor, a processing unit, a controller, another integrated circuit, and the like. The interconnect may be replaced by one or more circuits that may couple first portion 490, second portion 480, second ACU 473, communication modules 461, and cryptographic unit 462 to each other.

Any one of the communication modules may be configured to receive access requests such as read requests and write requests. For simplicity of explanation, the following examples refer to a write request of a data unit. It is also assumed that the integrated circuit is configured to manage write requests from an initiator that may not belong to the group of processing units. The write request is for writing a data unit to a target address. The target address may be an address within a memory space supported by the volatile memory 470.

A communication module 461 may be configured to send the data unit to the interconnect 450 that in turn sends the data unit to first ACU 493. The communication module 461 may be configured to send the data unit to the second ACU 273 in case a transaction is marked as uncacheable. First ACU 493 is located upstream from the shared cache (i.e., CPU's L2 cache 292) in the sense that the data unit has to pass through the first ACU 493 before the data unit may be written to the CPU's L2 cache 492. During operation, it is assumed that the interconnect 450 will send at least some uncacheable data units to second ACU 473 and may send at least some cacheable data units to first ACU 492 (e.g., under certain conditions).

The first ACU 493 may be configured to determine at least one destination of the write request. The destination may be the volatile memory 470, the CPU's L2 cache 492, or both. Thus, the first ACU 493 may send the data unit only to the volatile memory 470, only to the CPU's L2 cache 492, or send the data unit to both volatile memory 470 and the CPU's L2 cache 492. The first ACU 493 may be configured to make the destination determination based on access rights of the initiator and on a caching policy.

In an example, the first ACU 493 may send the data unit to the volatile memory 470. The first ACU 493 may send the data unit to the volatile memory 470 without sending the data unit to the CPU's L2 cache 493. In another example, when an old version of the data unit does not exist in the CPU's L2 cache 492 and the transaction is not marked as write-allocate, the first ACU 493 may send the data unit to the volatile memory 470 without sending the data unit to the CPU's L2 cache 493. In yet another example, when an old version of the data unit does not exist in the CPU's L2 cache 492 and the transaction is not marked as write-allocate, the first ACU 493 may send the data unit to the volatile memory 470 without sending the data unit to the CPU's L2 cache 493, even when the data unit is cacheable.

The sending of a cacheable data unit to the volatile memory 470 may include sending the cacheable data unit via a bypass path 499. This assumes that an outdated version of the data unit does not exist in the CPU's L2 cache 492 and the transaction is not marked as write-allocate. The sending through the bypass path 499 may be unnoticed by any of the processing units or may be executed autonomously, even without intervention of any processing units of the group. The sending through the bypass path may include maintaining the data unit unchanged. For example, sending through the bypass path may include suppressing or otherwise avoiding tagging of the data unit as being sent from the group of processing units. The tagging may be avoided because the data unit does not reach the CPU's L2 cache.

The first ACU 493 may also be configured to examine (e.g., snoop) the CPU's L2 cache 492 to determine whether the CPU's L2 cache 492 stores an older data unit associated with the target address. The examination of the CPU's L2 cache 492 may be executed after the data unit is deemed to be cacheable or it may be executed before checking whether the data unit is cacheable or not. When the examination of the CPU's L2 cache 492 discovers that shared cache stores an older data unit associated with the target address, then the first ACU 492 invalidates that older data unit.

When it is determined that the shared cache is one of the at least one destination in which the data unit should be written, the first ACU 493 may assist in (e.g., generate a request for) writing the data unit to the shared cache (e.g., CPU's L2 cache 492). In further response to the determination, the first ACU 493 may be arranged to associate a source of the data unit with the group of processing units to provide an associated data unit, and to participate in sending the associated data unit to the memory unit.

Because the data unit is sent to the volatile memory 470 from the first portion 490, the data unit may be associated with the group of processing units. The association is part of the configuration of the first ACU 493. The various ACUs of the integrated circuit may be configured to perform the association before sending a data unit to the volatile memory.

The second ACU 473 may be configured to receive the associated data unit and determine that the associated data unit should be written to the volatile memory 470. The determination may be based on access rights of the group of processing units. In further response to this determination, the second ACU 473 may be configured to assist in writing the data unit to the memory unit.

Figure 5:
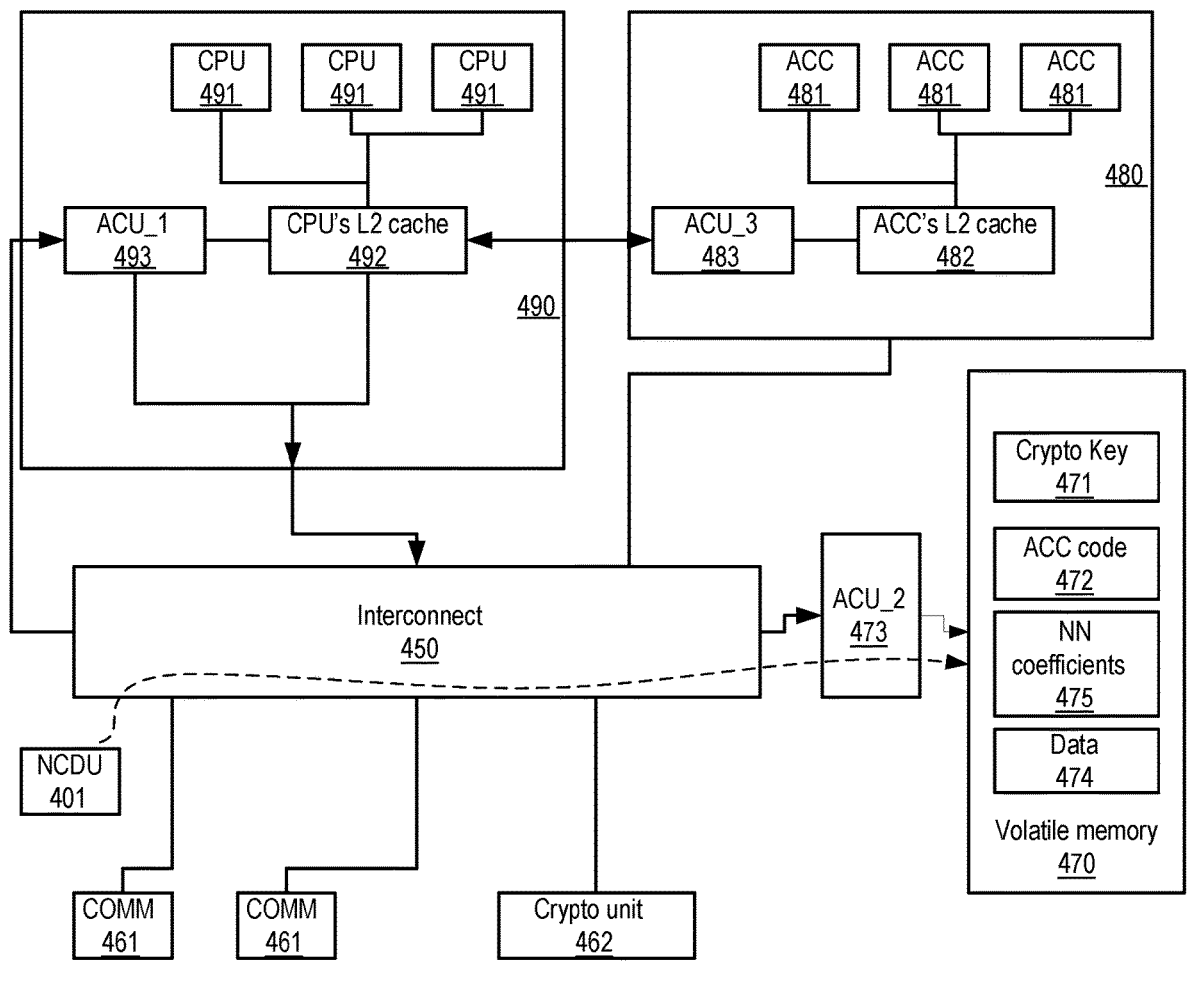
FIG. 5 illustrates an example of an example integrated circuit and a path of a noncacheable data unit.

FIG. 5 illustrates an example of an integrated circuit 400 and a path of a noncacheable data unit (NCDU) 401. In FIG. 5, the interconnect 450 identifies the data unit as being a uncacheable data unit, determines whether to send the data unit to the volatile memory 470, and sends the data unit to the second ACU 473 without sending it to the first ACU 493. This may also occur when the is data unit is cacheable, but an old version of the data unit does not exist in the CPU's L2 cache 492, and when the transaction is not marked as write-allocate.

Figure 6:
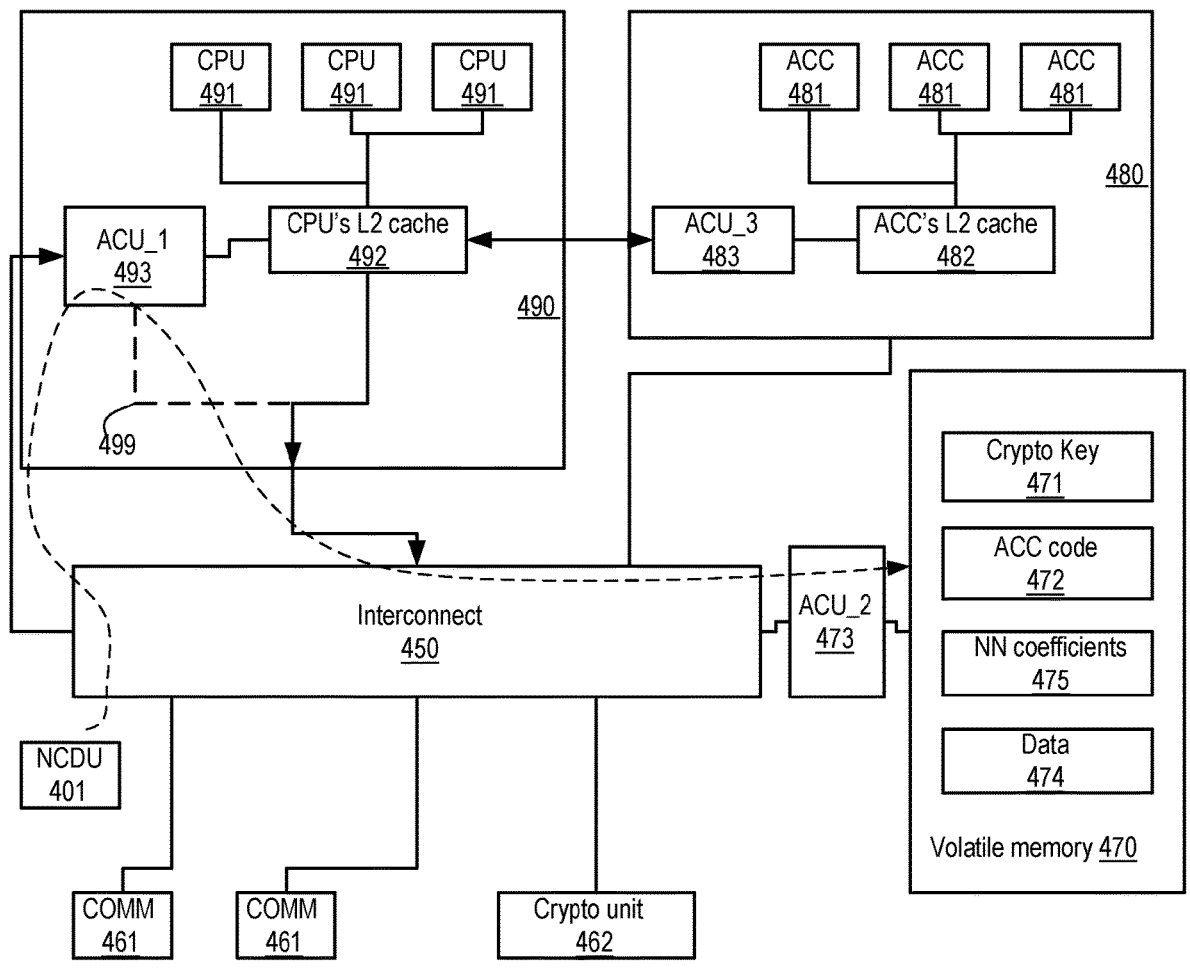
FIG. 6 illustrates an example of an example of integrated circuit and a path of a cacheable data unit.

FIG. 6 illustrates an example of an integrated circuit 400 and a path of a data unit. In FIG. 6, the interconnect 450 determines that the is data unit is cacheable, but an old version of the data unit does not exist in the CPU's L2 cache 492 and the transaction is not marked as write-allocate. The first ACU 493 may be configured to send NCDU 401 without associating the source of the data unit with the group of processing units.

Figure 7:
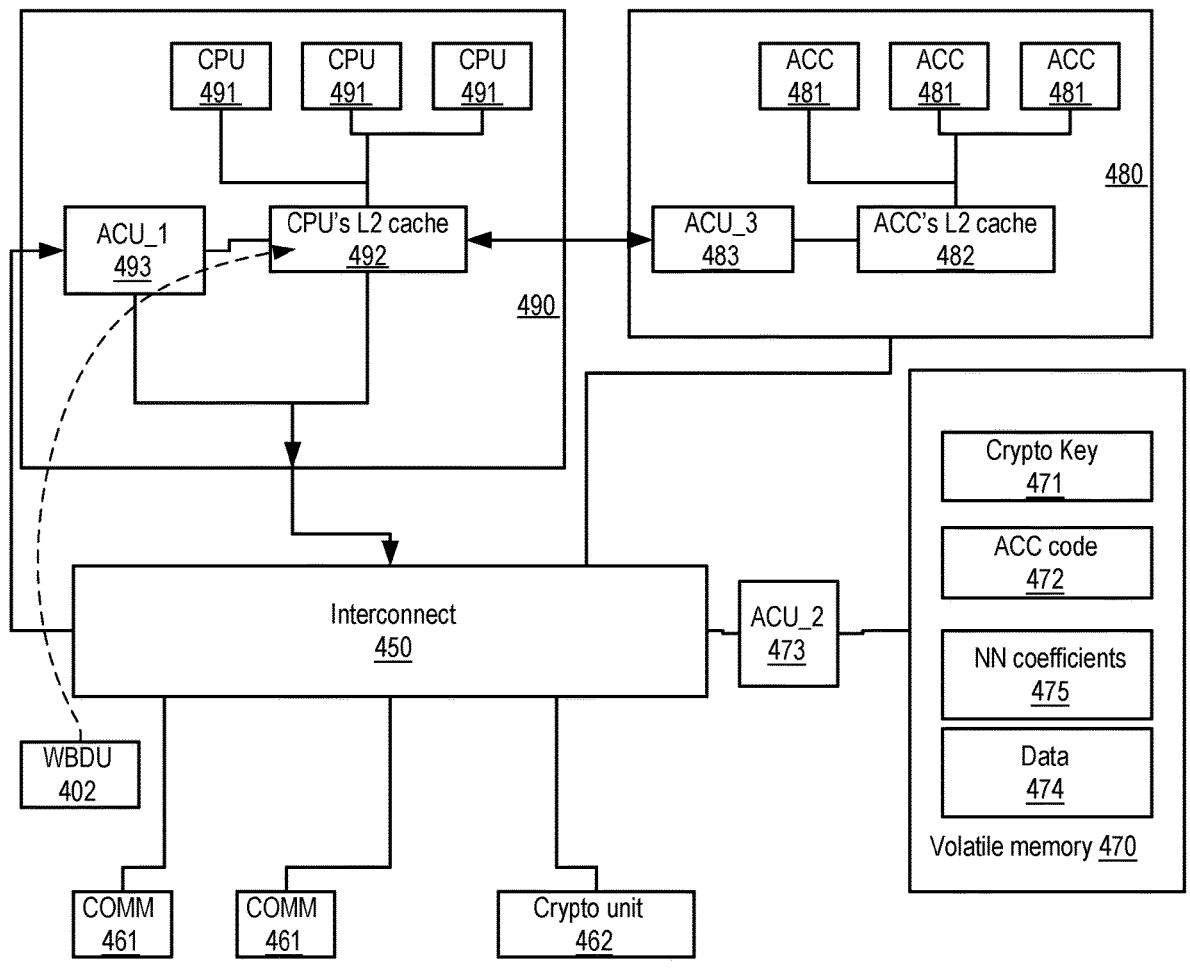
FIG. 7 illustrates an example of an example of integrated circuit and a path of a write back data unit.

FIG. 7 illustrates an example of an integrated circuit 400 and a path of a write back data unit (WBDU) 402. As described herein, the data unit may be referred as a write back data unit because the caching policy applied by the shared cache in relation to the data unit is a write back caching policy. In FIG. 7, the first ACU 493 receives WBDU 402, identifies it as a write back data unit, and writes the WBDU only to the cached memory without sending it to the volatile memory 470.

When a write through policy is applied, a data unit may be targeted to the volatile memory but may or may not be targeted to the shared cache. A write allocate indicator may be set or reset to indicate whether write allocate is enabled or disabled. When the write allocate is disabled, the shared cache is not updated. Conversely, when the write allocate is enabled, then the shared cache is updated. In both cases, an associated data unit is sent to the volatile memory 470.

Figure 8:
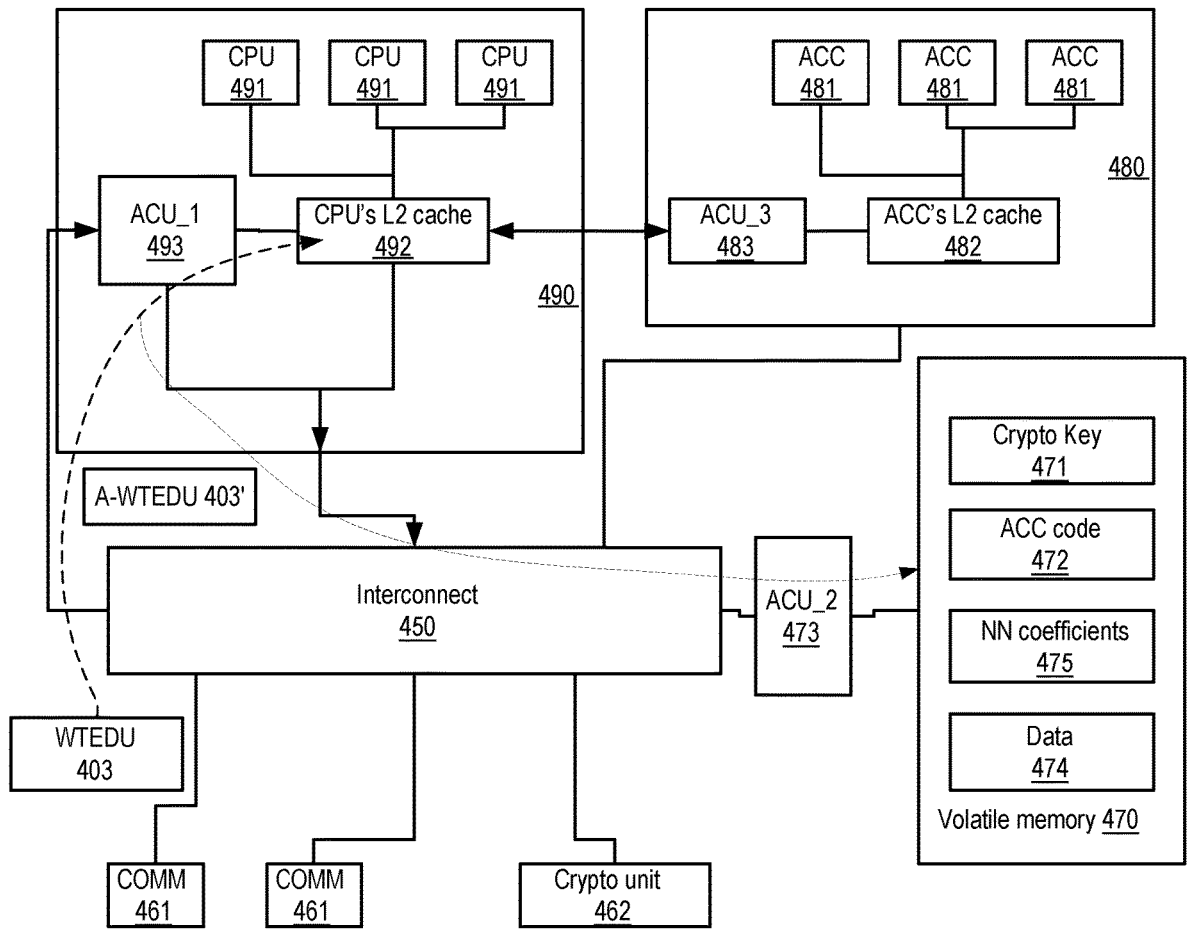
FIG. 8 illustrates an example of an example of integrated circuit and a path of a write through enabled data unit.

FIG. 8 illustrates an example of an integrated circuit 400 and a path of a write through enabled data unit (WTEDU) 403. As described herein, the data unit may be referred to as write through enabled because the caching policy is write through and the write allocate is enabled. In FIG. 8, WTEDU 403 reaches first ACU 493. Upon receipt of the WTEDU 403, first ACU 493 detects that the data unit is a write through enabled data unit, sends WTEDU 403 to the shared cache, generates an associated write through enabled data unit A-WTEDU 403', and sends the A-WTEDU 403' to the volatile memory 470. The A-WTEDU 403' is associated with the group of processing units.

Figure 9:
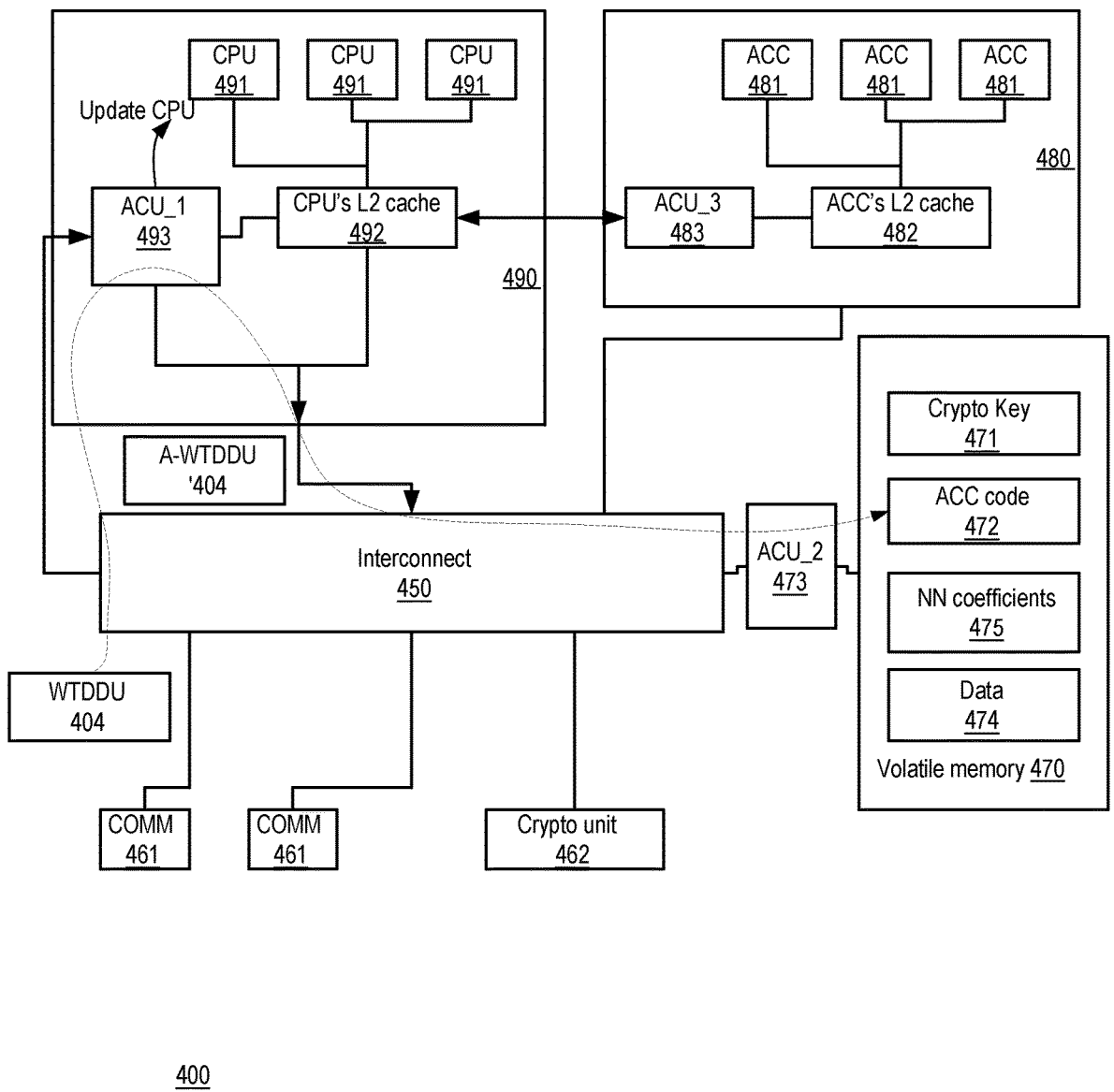
FIG. 9 illustrates an example of an example of integrated circuit and a path of a write through disabled data unit.

FIG. 9 illustrates an example of an example of integrated circuit 400 and a path of a write through disabled data unit (WTDDU) 404. As described herein, the data unit may be referred to as write through disabled because the caching policy is write through and the write allocate is disabled. In FIG. 9, WTDDU 404 reaches first ACU 493. Upon receipt of the WTDDU 404, first ACU 493 detects that the data unit is a write through disabled data unit, sends WTDDU 404 to the shared cache, generates an associated write through disabled data unit A-WTDDU 404', and sends the A-WTDDU 404' to the volatile memory 470. The A-WTEDU 403' is associated with the group of processing units.

The third access control unit ACU_3 483 may be configured to control (e.g., according access rules) a sharing of data units between the CPU's L2 cache 492 and the ACC's L2 cache. The processing units may host operating systems and may be more susceptible to tampering (e.g., hacking attempts). To reduce or minimize the risks associated with tampering, at least some of the data units stored in the ACC's L2 cache should not be sent to the CPU's L2 cache 492. Some of the data in the ACC's L2 cache may be shared with the CPU's L2 cache 492, especially when one or more processing unit and one or more accelerators participate in certain tasks.

The third access control unit ACU_3 483 may be configured to receive a request to share data between ACC's L2 cache and CPU's L2 cache. The third access control unit ACU_3 483 may also be configured to determine whether to share the data based on access rights of the group of processing units.

Figure 10:
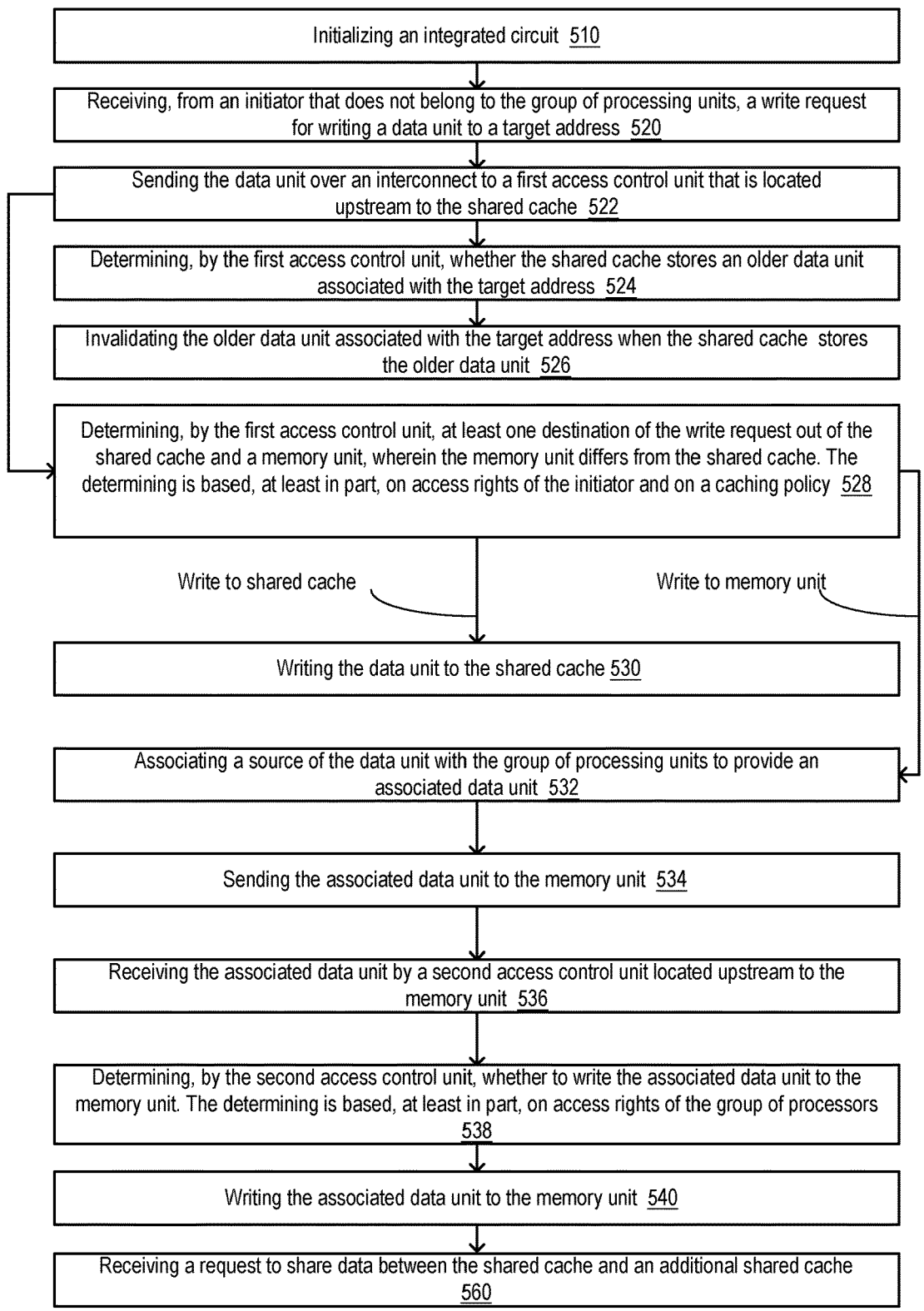
FIG. 10 illustrates an example of a method.

FIG. 10 illustrates an example of method 500. Method 500 may provide for updating a shared cache that is shared by a group of processing units. Method 500 may start by step 510 of initializing an integrated circuit. This may include loading or determining access rules during a boot sequence. Step 510 may include configuring an access rule data structure accessible by the first access request unit during a boot process of a security unit of the integrated circuit. The access rule data structure may store access limitations regarding a first plurality of address ranges. Address ranges not included in the first plurality of address ranges are accessible by an initiator. This provides a compact access rule data structure that may focus on few memory ranges that have access limitations.

Step 510 may be followed by step 520 of receiving, from an initiator outside (i.e., not belonging to) the group of processing units, a write request for writing a data unit to a target address. Step 520 may be followed by step 522 of sending the data unit over an interconnect to a first access control unit that is located upstream from the shared cache.

Step 522 may be followed by step 524 of determining, by the first access control unit, that the shared cache stores an older data unit associated with the target address. The determination may be based on the content of the shared cache, and may involve an examination of the shared cache. Step 524 may be followed by step 526 of invalidating the older data unit associated with the target address responsive to the determination that the shared cache stores the older data unit.

Step 522 may also be followed by step 528 of determining, by the first access control unit, at least one destination of the write request out of the shared cache and a memory unit, where the memory unit differs from the shared cache. The determination is based on access rights of the initiator and on a caching policy. Examples of the caching policy may include write back, write through with enabled, disabled write allocate, or another caching policy.

Step 528 may include determining, by the first access control unit, that the at least one destination is the shared cache. In an example, the determination may occur when the caching policy is a write back policy. In another example, the determination may occur when the caching policy is a write through policy and a write allocate attribute associated with the data unit is of a first value that indicates that a write allocate is enabled. In yet another example, the determination may occur when the caching policy is a write through policy and a write allocate attribute associated with the data unit is of a second value that indicates that a write allocate is disabled.

When determining to write the data unit to the shared cache, step 528 is followed by step 530 of writing the data unit to the shared cache. Alternatively, when determining to write the data unit to the memory unit, then step 528 is followed by steps 532 and 534. It should be noted that step 528 may be followed by both steps 530 and 532. Step 532 may include associating a source of the data unit with the group of processing units to provide an associated data unit.

Step 532 may be followed by step 534 of sending the associated data unit to the memory unit. Step 534 may be followed by step 536 of receiving the associated data unit by a second access control unit located upstream from the memory unit.

Step 536 may be followed by step 538 of determining, by the second access control unit, that the associated data unit should be written to the memory unit. The determination is based on access rights of the group of processing units. When the determination indicates that the associated data unit should be written to the memory unit, then step 538 may be followed by step 540 of writing the associated data unit to the memory unit. Alternatively, when the determination indicates that the associated data unit should not be written to the memory unit, then the associated data unit is not written to the memory unit.

Method 500 may include step 560 of receiving, by a third access control unit, a request to share data between the shared cache and an additional shared cache of the integrated circuit. The additional shared cache is shared by a group of hardware accelerators that differ from the processing unit. Step 560 may also include determining to share the data based on access rights of the group of processing units.

Figure 11:
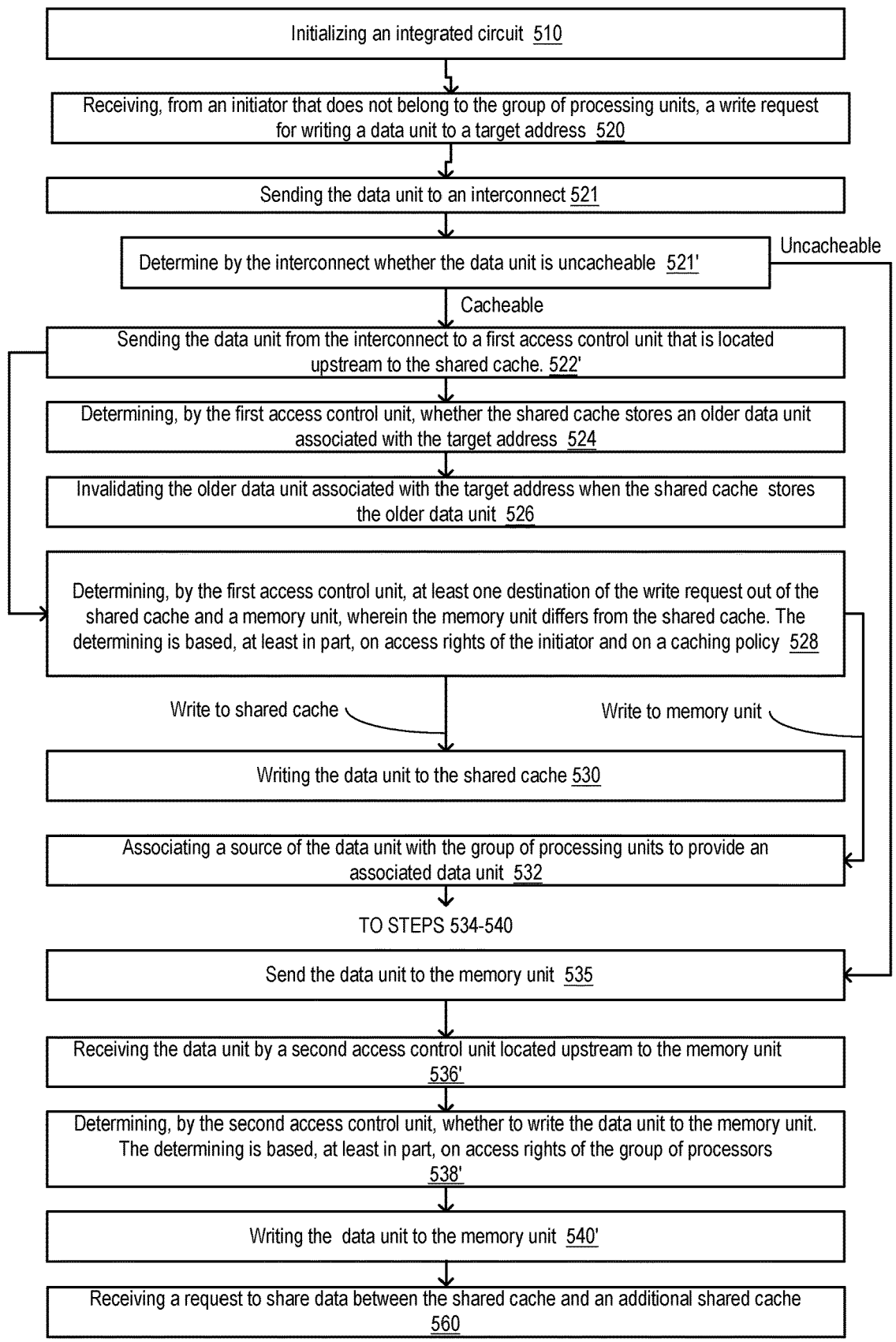
FIG. 11 illustrates an example of a method.

FIG. 11 illustrates an example of method 501. Method 501 differs from method 500 by including additional steps 521, 521', 522', 535, 536', 538' and 540', and by excluding step 522. Step 521 follows step 520 and includes sending the data unit to an interconnect. Step 521 may be followed by step 521' of determining, by the interconnect, whether the data unit is cacheable. In response to a determination that the data unit is cacheable, step 521' may be followed by step 522' of sending the data unit from the interconnect to a first access control unit that is located upstream from the shared cache.

Step 522' may be followed by step 524 of determining, by the first access control unit, that the shared cache stores an older data unit associated with the target address. The determination may be based on the content of the shared cache, and may involve an examination of the shared cache. Step 524 may be followed by step 526 of invalidating the older data unit associated with the target address responsive to the determination that the shared cache stores the older data unit.

Step 522' may be followed by step 528 of determining, by the first access control unit, at least one destination of the write request out of the shared cache and a memory unit, where the memory unit differs from the shared cache. The determination is based on access rights of the initiator and on a caching policy. Step 528 may include determining, by the first access control unit, that the at least one destination is the shared cache. When determining to write the data unit to the shared cache, step 528 is followed by step 530 of writing the data unit to the shared cache. Alternatively, when determining to write the data unit to the memory unit, then step 528 is followed by steps 532-540.

In response to a determination that the data unit is cacheable, step 521' may be followed by step 535 of sending the data unit to the memory unit. Step 535 may be followed by step 536' of receiving the data unit by a second access control unit located upstream from the memory unit. Step 536' may be followed by step 538' of determining, by the second access control unit, that the data unit should be written to the memory unit. The determination is based on access rights of the group of processing units. When determining to write the data unit to the memory unit, then step 538' may be followed by step 540' of writing the data unit to the memory unit.

Figure 12:
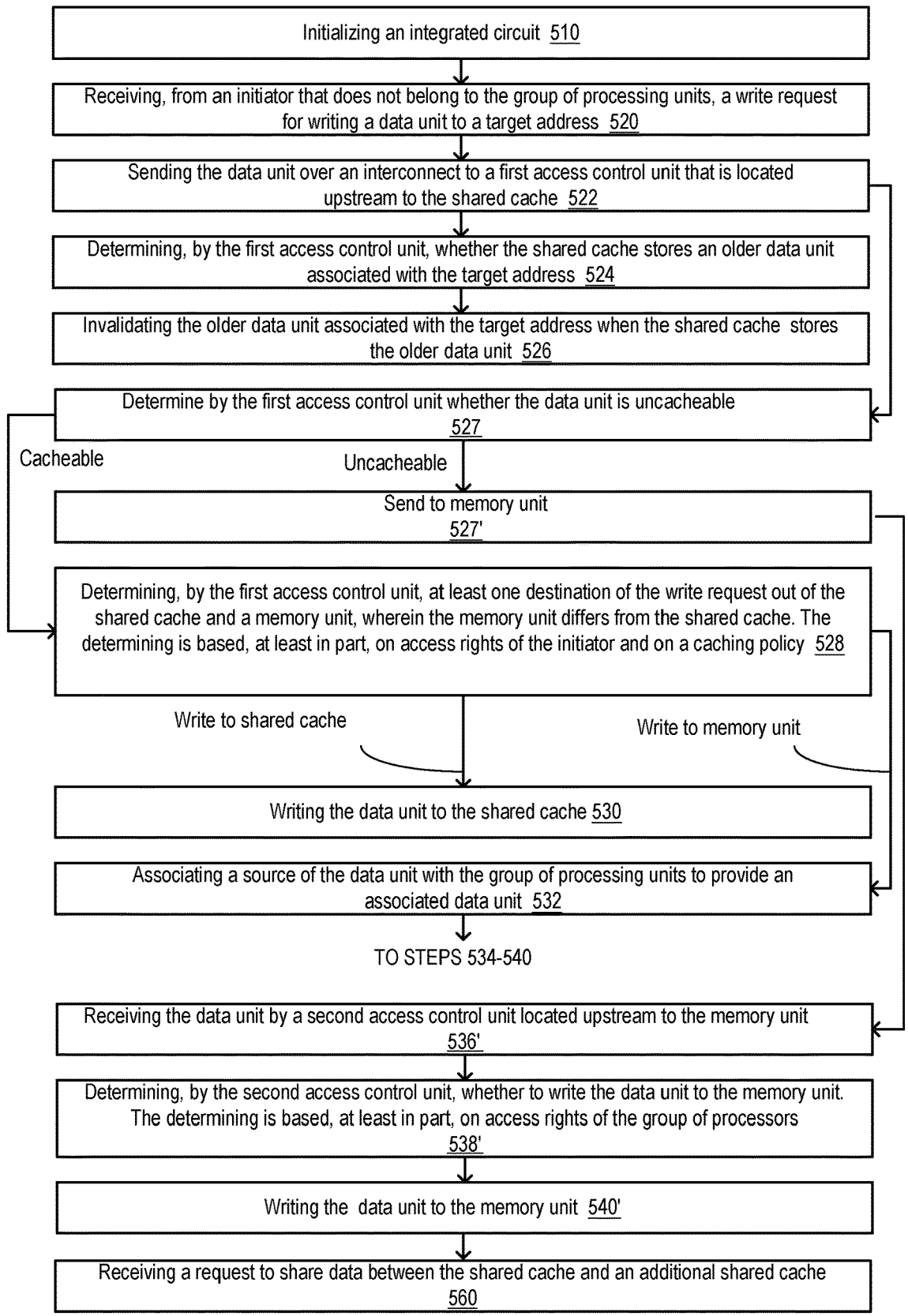
FIG. 12 illustrates an example of a method.

FIG. 12 illustrates an example of method 502. Method 502 differs from method 500 by including additional steps 527, 527', 536', 538' and 540'. Step 527 follows step 522, where step 522 includes sending the data unit over an interconnect to a first access control unit. Step 527 may include determining, by the first access control unit, whether the data unit is cacheable. In response to a determination that the data unit is cacheable, step 527 may be followed by step 527' of sending the data unit from the first access control unit to a memory unit. Step 527' may be followed by step 536' of receiving the data unit by a second access control unit located upstream from the memory unit. Step 536' may be followed by step 538' of determining, by the second access control unit, that the data unit should be written to the memory unit. The determination is based on access rights of the group of processing units. When determining to write the data unit to the memory unit, then step 538' may be followed by step 540' of writing the data unit to the memory unit.

In response to a determination that the data unit is cacheable, step 527 may be followed by step 528 of determining, by the first access control unit, at least one destination of the write request out of the shared cache and a memory unit, where the memory unit differs from the shared cache. The determination is based on access rights of the initiator and on a caching policy. Step 528 may include determining, by the first access control unit, that the at least one destination is the shared cache. When determining to write the data unit to the shared cache, step 528 is followed by step 530 of writing the data unit to the shared cache. Alternatively, when determining to write the data unit to the memory unit, then step 528 is followed by steps 532-540.

Secure Debugging Using Multi Factor Authentication

Integrated circuits may be debugged during their development state, and after they are manufactured. A commonly used debug standard is the JTAG. The JTAG is named after the Joint Test Action Group which codified it, and is an industry standard for verifying designs and testing printed circuit boards after manufacture (www.wikipedia.org). JTAG implements standards for on-chip instrumentation in electronic design automation (EDA) as a complementary tool to digital simulation. It specifies the use of a dedicated debug port implementing a serial communication interface for low-overhead access without requiring direct external access to the system address and data buses. The interface connects to an on-chip Test Access Port (TAP) that implements a stateful protocol to access a set of test registers that present chip logic levels and device capabilities of various parts.

The Joint Test Action Group formed in 1985 to develop a method of verifying designs and testing after manufacture. In 1990 the Institute of Electrical and Electronics Engineering (IEEE) codified the results of the effort in IEEE Standard 1149.1-1990, entitled Standard Test Access Port and Boundary-Scan Architecture.

The dedicated debug port of the JTAG standard or any other debug port used to debug an integrated circuit may be used to tamper with (e.g., hack) the integrated circuit. To reduce or prevent this tampering, there is a growing need to provide a secure debugging method, and therefore a growing need for an integrated circuit with secure debugging capabilities. The secure debugging may reduce or prevent hackers unauthorized access to data or commands stored in the integrated circuit. The secure debugging may also prevent an authorized debug process from gaining access to data or commands that should not be exposed to the debug process.

There may be provided an integrated circuit that may include a debug port and a security unit. The security unit may be configured to determine whether to enable the debugging. The security unit may determine not to enable the debugging if it suspects that the request to debug is an improper request, such as a result of a hacking of the integrated circuit. For example, in addition to controlling (e.g., preventing) activation or debugging, the security unit may be configured to control the timing of the debugging. In an example, the debugging may be prevented from executing until after the termination of all programs other than the program to be debugged. The security unit may perform one or more additional measures to reduce or prevent unnecessary exposure of data or commands to during the debugging.

Figure 13:
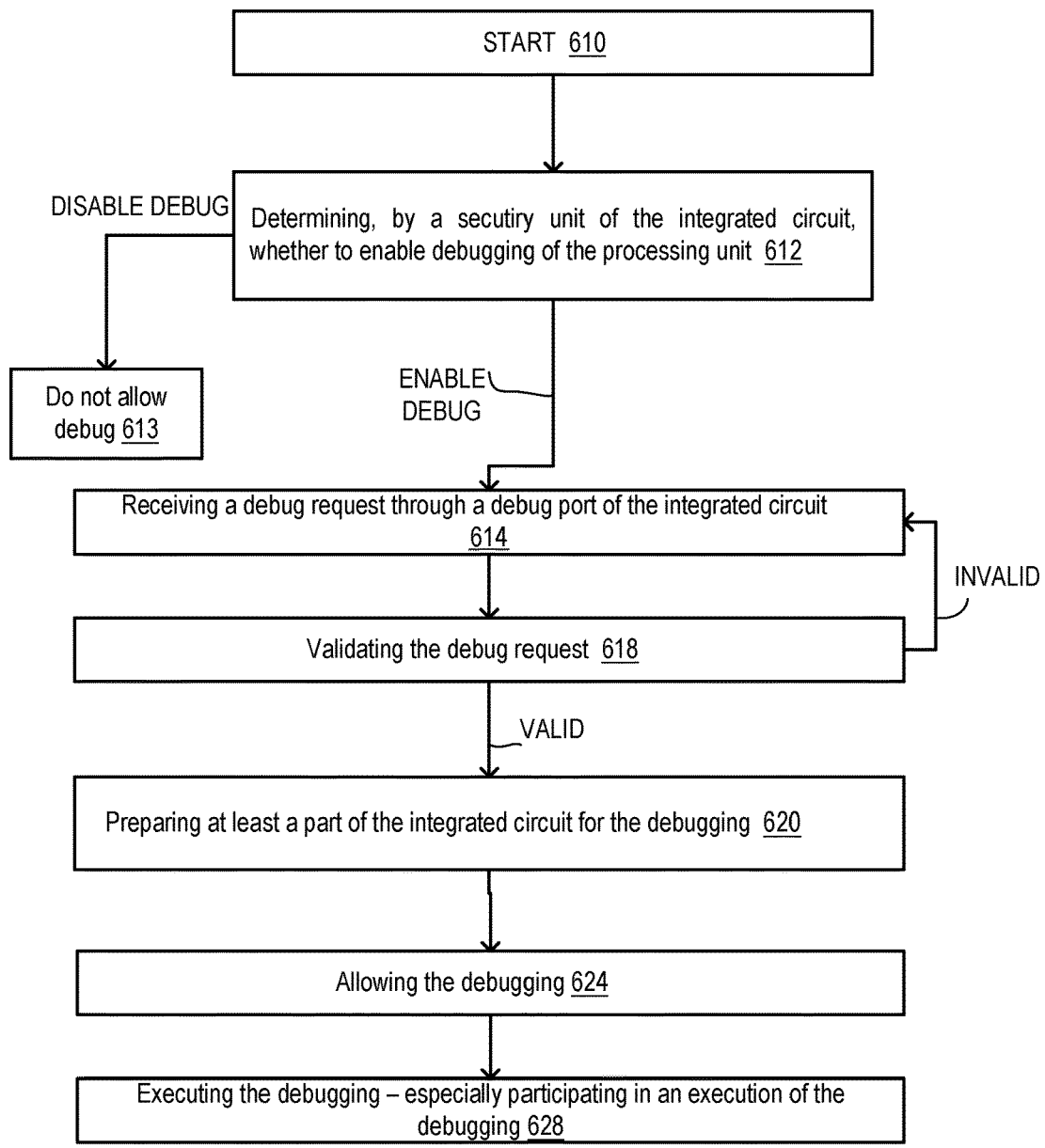
FIG. 13 illustrates an example of a debugging method.

FIG. 13 illustrates an example of debugging method 600. Debugging method 600 may start at step 610. Step 610 may be triggered during a boot process of the integrated circuit, following the boot process, upon reaching a predefined time interval, in response to the integrated circuit experiencing a predetermined failure that is defined as requiring debugging, in response to occurrence of a certain event, or in response to another trigger. Events that may trigger step 610 may include events requiring a debugging, such as a predefined behavior of the integrated circuit, a predefined behavior of a unit that is affected by the integrated circuit, a software update of a unit that is affected by the integrated circuit, a replacement of a unit of a vehicle, or other triggering event.

Step 610 may be followed by step 612 of determining, by a security unit of the integrated circuit, whether to enable debugging of the processing unit. This determination may be based on a specific debug request, or may be based on other parameters and not be related to a specific debug request. For example, the determination may be made based on whether debugging may be executed during one or more predefined periods, where the periods may include the lifespan of the integrated circuit, the expiration of a certain period, or following the execution of a subsequent reset and boot of the integrated circuit. The determining may be executed during a boot process of the security unit, during which the securing circuit retrieves boot instructions from a non-volatile memory unit of the integrated circuit. The boot process may include decrypting encrypted instructions or data stored in a memory unit of the integrated circuit using a unique identifier of the processing unit.

Step 612 may include generating a debugging determination indicator. In an example, the debugging determination indicator may be unchangeable except by the determination step 612. The debugging determination indicator may be accessible to the security unit or to the access control unit.

In response to a determination not to perform the debugging, step 612 may be followed by step 613 of preventing a debugging. Alternatively, in response to a determination to perform the debugging, step 612 may be followed by step 614 of receiving a debug request through a debug port of the integrated circuit.

Step 614 may be followed by step 618 of validating the debug request. The validating may involve performing an authentication process or sending a challenge and waiting to receive a valid response, receiving a password and checking the validity of the password, and the like. The validating may include using public or private keys of the integrated circuit, validating that a debug requestor that generated the debug request is aware of a unique identifier of the processing unit, and the like. Step 618 may be executed by an access control unit that may be the security unit, may differ from the security unit, may be included in the security unit, or may not be included in the security unit.

In response to step 618 determining that the debug request is not valid, then step 618 may be followed by returning to step 614 to wait for any subsequent debug request. A debug request that is determined to be invalid may also trigger an alert or any other response, such as preventing any debugging to occur within a predefined time period following execution of step 618.

In response to step 618 determining that the debug request is valid, then step 618 may be followed by 620 of preparing at least a part of the integrated circuit for the debugging. The at least a part of the integrated circuit may include the processing unit, memory resource accessible by the processing unit, other processing units, or memory resources accessible by the other processing units. Step 620 may include validating that any program executed by the processing unit that is not related to the debugging is terminated before the debugging. In an example, a program may be considered to be related to the debugging when an execution of the program is required for a completion of the debugging. Step 620 may include erasing any sensitive information from any memory unit accessible to the debugging. Sensitive information may be defined as information that is flagged as sensitive or information that should not be exposed during the debugging. Examples of sensitive information may include cryptographic keys, neural network coefficients, filter coefficients, and code. Another example of sensitive information may include the content of the volatile memory 470 in FIG. 14. Step 620 may also include replacing unencrypted (e.g., decrypted) data units or commands by corresponding encrypted data units or commands.

Step 620 may be followed by step 624 of allowing the debugging. Once step 624 is successfully completed, step 624 may be followed by step 628 of executing the debugging. The execution of the debugging may include participating in an execution of the debugging. The debugging may be performed under a control of a tester or another initiator, and the integrated circuit may participate in the debugging. The participation in the debugging may include executing debugging commands, conveying data or commands related to the debugging, executing a program related to the debugging, and the like. Step 628 may be controlled by the initiator.

Figure 14:
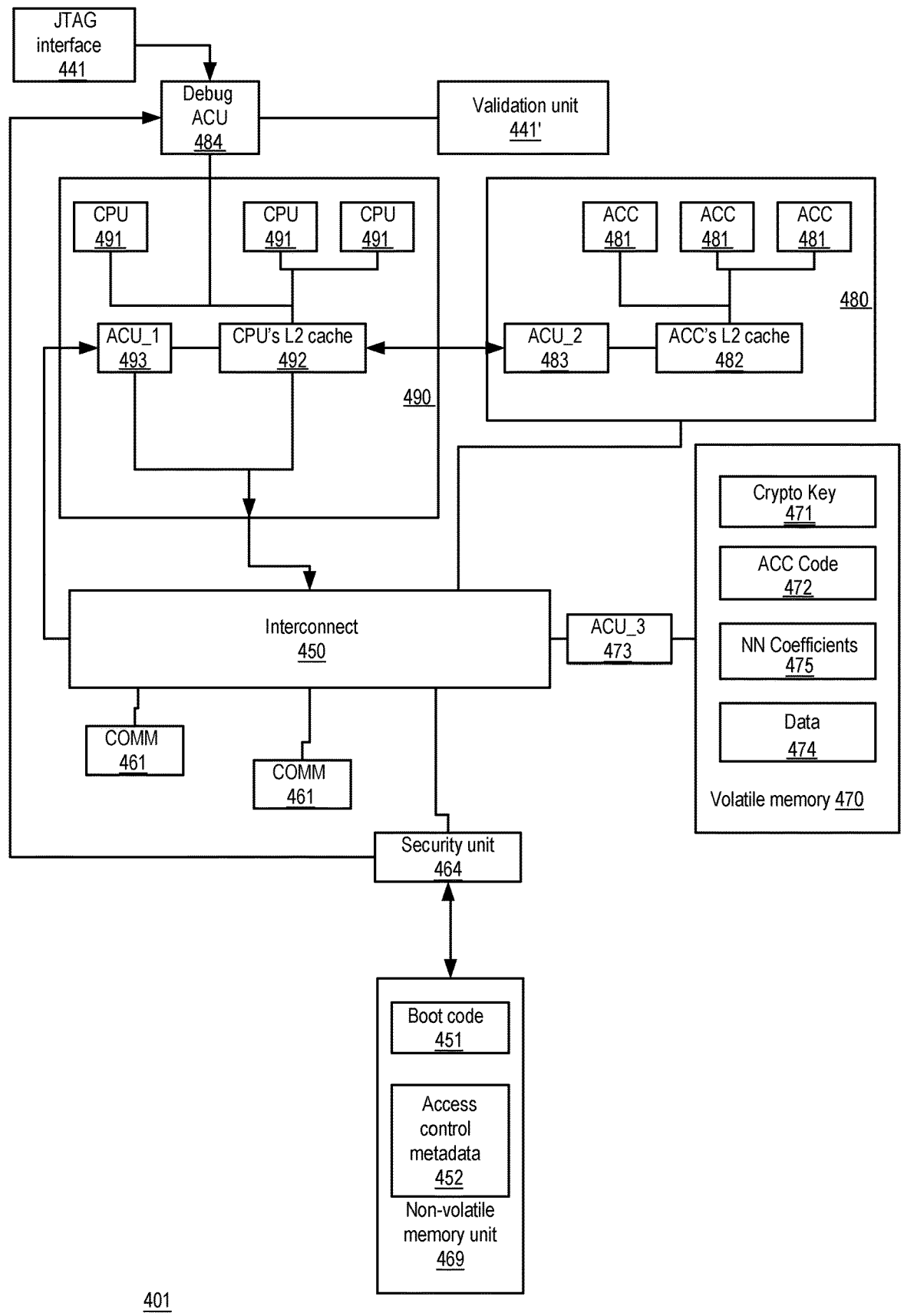
FIG. 14 illustrates an example of an integrated circuit.
Figure 15:
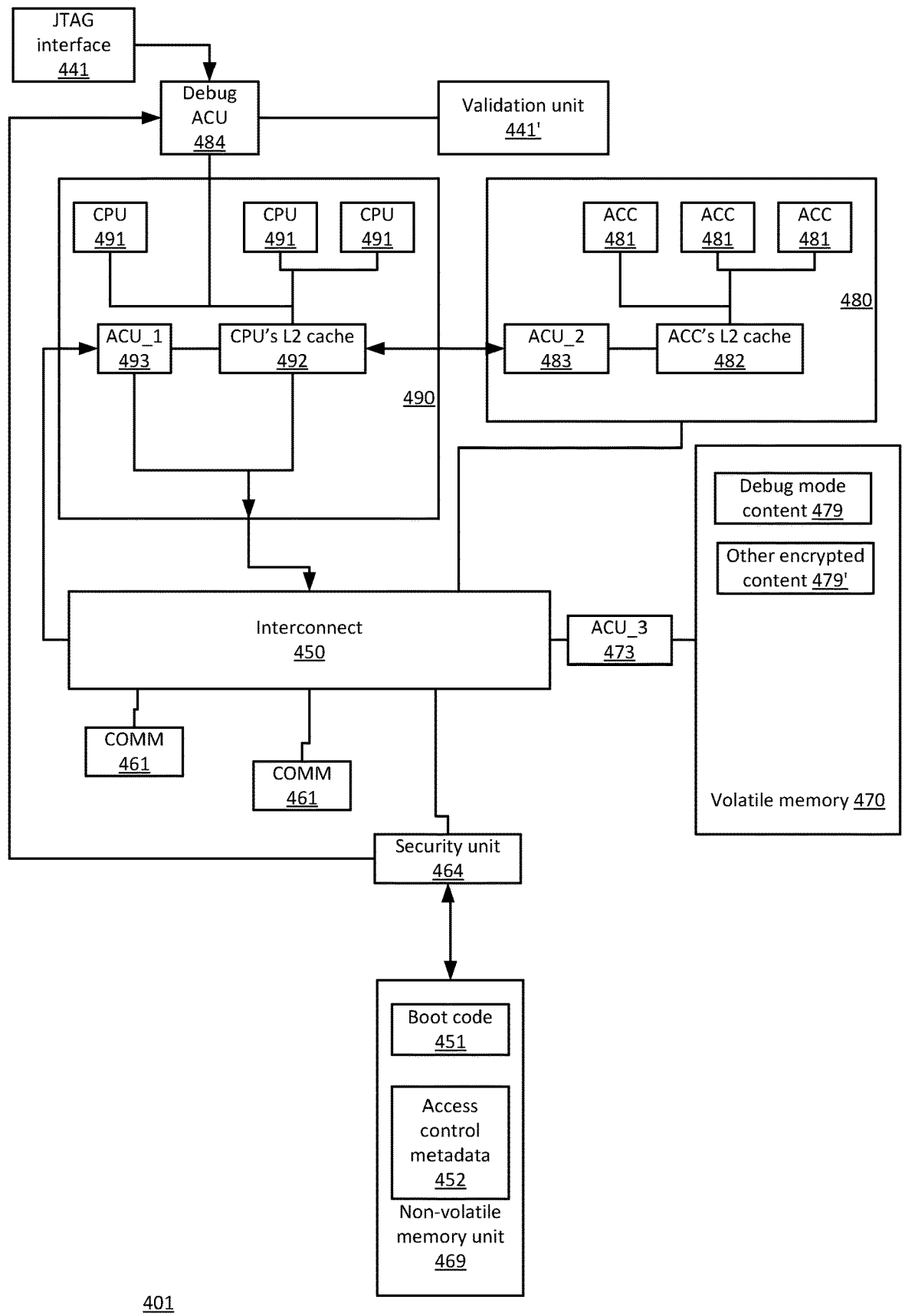
FIG. 15 illustrates an example of an integrated circuit.
Figure 16:
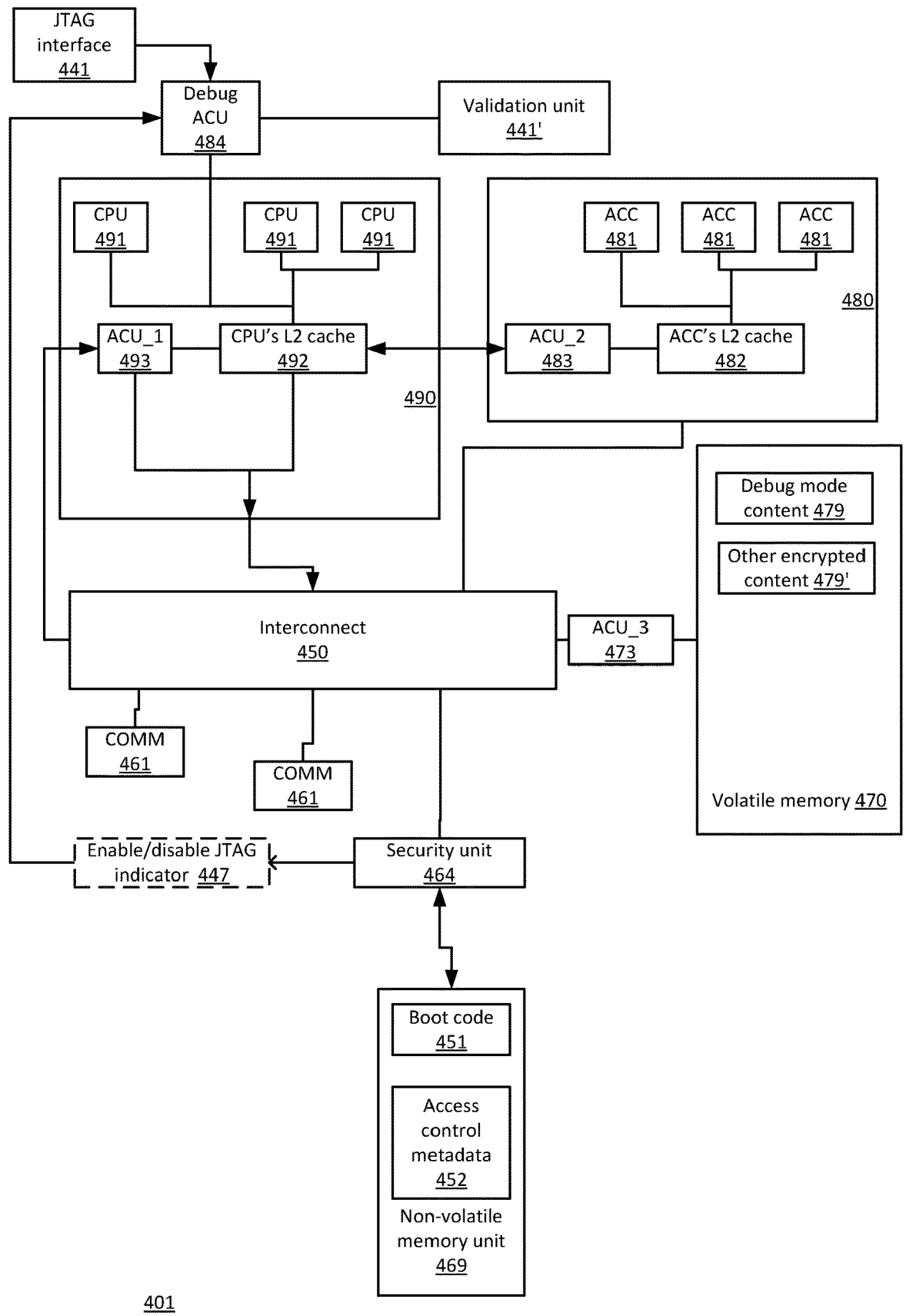
FIG. 16 illustrates an example of an integrated circuit.
Figure 17:
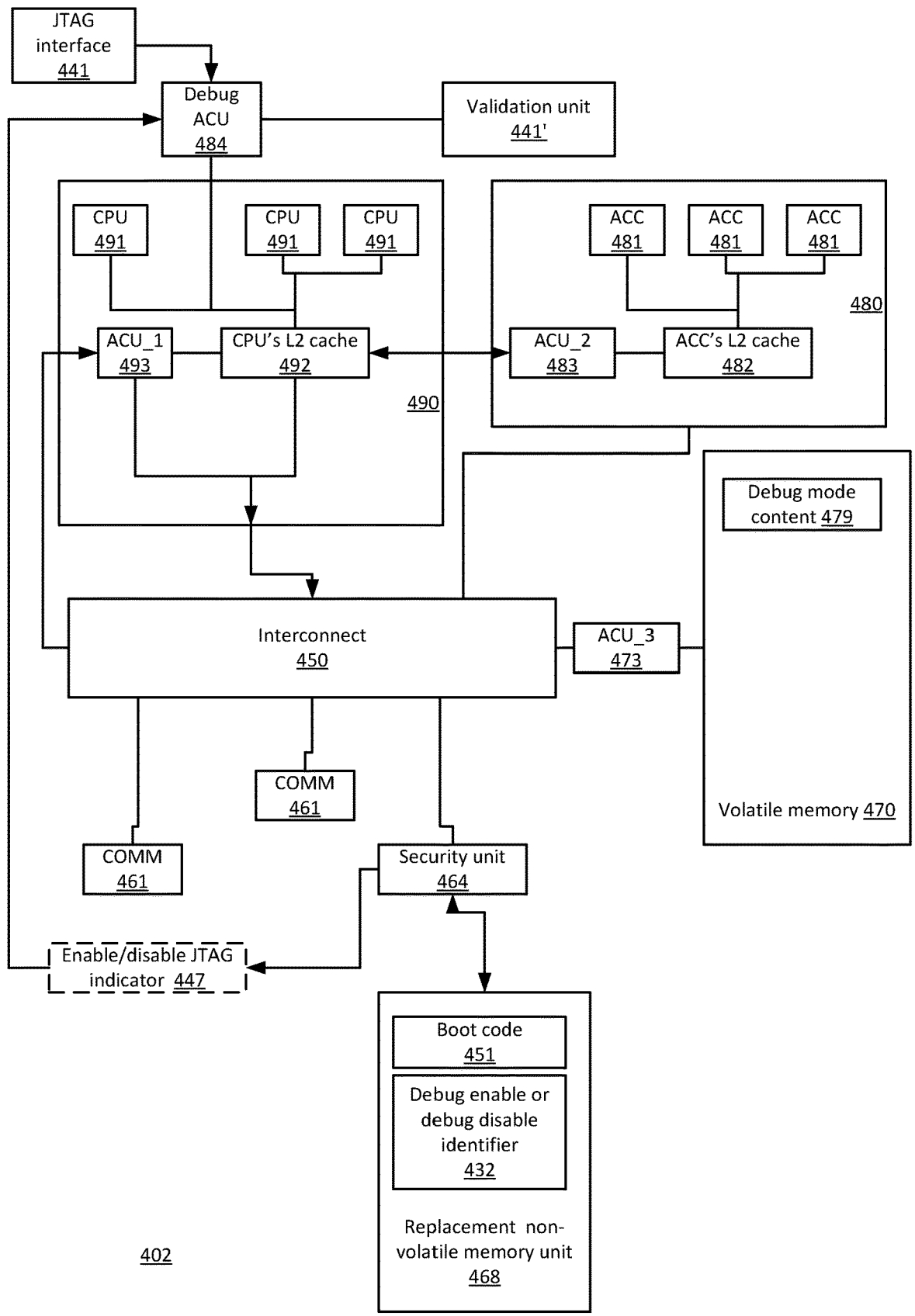
FIG. 17 illustrates an example of an integrated circuit.
Figure 18:
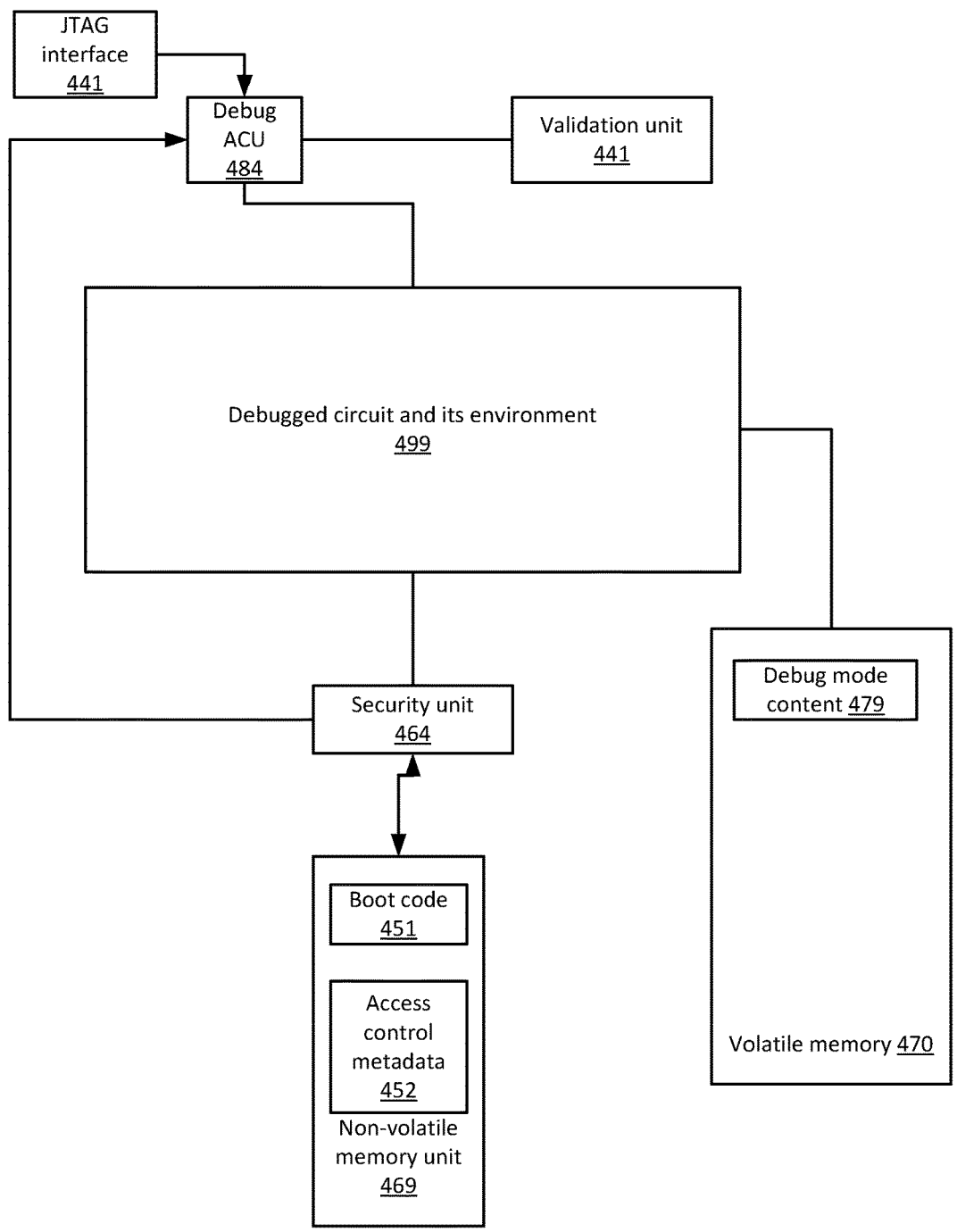
FIG. 18 illustrates an example of an integrated circuit.

FIGS. 14, 15, and 16 illustrate integrated circuit 401. FIG. 17 illustrates integrated circuit 402. Integrated circuits 401 and 402 may be configured to execute method 500. FIG. 18 illustrates integrated circuit 403. Integrated circuit 403 may be configured to execute method 600. Integrated circuits 401, 402, and 403 may be included in processing unit 110.

Integrated circuit 401 may include:
 a. A debug interface such as JTAG interface 441.
 b. A validation unit 441' for validating a debug request.
 c. A debug access control unit ("Debug ACU") 484.
 d. A non-volatile memory unit out of non-volatile memory unit 469 (see FIGS. 14, 15, and 16).

e. A group of processing units such as central processing units (CPUs) 491.
f. A shard cache such as a level two (L2) cache of the CPU's (denoted "CPU's L2 cache") 492. Other level shared cache memory may be used.
g. A first access control unit (ACU_1) 493.
h. A second access control unit (ACU_2) 473.
i. A group of hardware accelerators (ACC) 481.
j. An additional shard cache such as a L2 cache of the ACC's (denoted "ACC's L2 cache") 482.
k. An interconnect 450.
l. A third access control unit (ACU_3) 473.
m. A volatile memory 470 that may store information or commands such as a cryptographic key ("crypto key") 471, code of one or more of the hardware accelerators ("ACC code") 472, neural network coefficients ("NN coefficients") 475, and data 474. The volatile memory may be a DRAM memory unit.
n. A security unit 464.
o. Communication modules ("COMM") 461. Different communication modules may be allocated to different communication protocols or to different initiators.

The hardware accelerators 481 may be neural network processors, programmable arrays of processing units, and the like. A hardware accelerator may be tailored to generate certain types of tasks in a manner that is more efficient than a general-purpose processing unit.

The shared caches may differ from L2 caches, the allocation between processing units or hardware accelerators may differ from those illustrated in FIG. 13. For example, a subset of the processing units may share a shared cache, a subset of the hardware accelerators may share a shared cache, the shared cache and the additional shared cache may not be coupled to each other, there may be multiple interconnects, the volatile memory may differ from a DRAM memory unit, there may be multiple volatile memory units, the integrated circuit may include one or more nonvolatile memory units, the crypto unit may be located elsewhere, there may be multiple crypto units, and the like.

A first portion 490 of the integrated circuit may include the group of CPUs 491, the first ACU 493, and the CPU's L2 cache 492. A second portion 480 of the integrated circuit may include the third ACU 483, the group of ACCs 481, and the ACC's L2 cache 482. The interconnect 450 may be coupled to the first portion 490, the second portion 480, the crypto unit 462, the second ACU 473, and to the communication modules 461. The interconnect 450 may be coupled, directly or indirectly, to initiators that initiate access requests. The initiators may include any circuit capable of initiating access requests. An initiator may include a sensor, a processing unit, a controller, another integrated circuit, and the like.

Any one of the communication modules may be configured to receive access requests such as read requests and write requests. For simplicity of explanation, the following examples refer to a write request of a data unit, where an initiator of the write request does not belong to the group of processing units. The write request is for writing a data unit to a target address. The target address may be an address within a memory space supported by the volatile memory 470.

In response to a determination that debugging is allowed, the JTAG interface 441 may be configured to receive a debug request 441 and a participate in the debugging. The participation may include participating in an exchange of commands or data between the integrated circuit 401 and an external initiator, such as a JTAG tester.

Debug ACU 484 may be configured to determine whether to grant a debug request. The determination may be conditioned on a determination by the security unit to allow debugging. The security unit 464 may be configured to determine whether debugging is enabled. For example, the security unit 464 may be configured to determine whether to enable debugging of the processing unit. This determination may be based on other parameters and not be related to a specific debug request. For example, the determination may be made based on whether debugging may be executed during one or more predefined periods, where the periods may include the lifespan of the integrated circuit, the expiration of a certain period, or following the execution of a subsequent reset and boot of the integrated circuit.

The security unit 464 may be configured to determine whether to enable debugging during a boot process of the security unit. During such a boot process, the security unit retrieves boot instructions from non-volatile memory unit 469. In an example, boot code 451 may be executed by the security unit 464. The boot process may include decrypting encrypted instructions or data stored in a memory unit of the integrated circuit. The decrypting may be executed using any suitable decryption key using a unique identifier of the processing unit. The security unit 464 may be configured to generate a debugging determination indicator, such as "enable/disable JTAG indicator" 447 of FIGS. 16 and 17. In an example, the debugging determination indicator may be unchangeable except by a debugging determination step. The debugging determination indicator may be accessible to the security unit or to the access control unit.

In response to a determination by the security unit 464 to enable debugging, the integrated circuit may wait for a debug request or may respond to an already received debug request through JTAG interface 441. The debug ACU 484 may send the debut request to validation unit 441' to validate the debug request. The validation unit 441' or the debug ACU 484 may perform an authentication process. This validation may include sending a challenge question and wait to receive a valid challenge response, receive a password and check the validity of the password, and the like. This validation may include using public or private keys of the integrated circuit, validating that a debug requestor that generated the debug request is aware of a unique identifier of the processing unit, and the like.

As shown in FIG. 17, the integrated circuit 402 differs from integrated circuit 401 of FIG. 16 by including a replacement non-volatile memory unit 468 instead of non-volatile memory unit 469. The replacement non-volatile memory 469 may be coupled to other parts of the integrated circuit when there is a need to debug the integrated circuit. The security unit 464 may access the replacement non-volatile memory 469 and participate in the execution of method 600. The secure debugging described herein may be executed for any unit to be debugged. One or more validation steps may be performed by the security unit 464, such as in addition to or instead of validation steps performed by the validation unit 441' may limit the access of the debug request to the validation unit 441'. In an example, the security unit 464 may be used to perform one or more validation steps when the validation unit 441' limits the access of the debug request to the validation unit 441'.

In response to a determination that the debug request is invalid, then the integrated circuit may wait for a subsequent debug request. An invalid debut request may also cause the integrated circuit to generate an alert or perform any other response. Alternatively, in response to a determination that the debug request is invalid, then the security unit 464 may be configured to prepare at least a part of the integrated circuit for the debugging. The preparation may include termination of any program executed by the processing unit and unrelated to the debugging prior to the debugging, and may include validation of that termination. The preparation may include erasing any sensitive information from any memory unit accessible to the debugging. The preparation may include replacing decrypted data units or commands with encrypted data units or commands.

An example of the volatile memory before preparation may be seen in FIG. 14. The volatile memory 470 may include stored information or commands such as a cryptographic key ("crypto key") 471, code of one or more of the hardware accelerators ("ACC code 472"), neural network coefficients ("NN coefficients 475"), and data 474. After the preparation, the volatile memory 470 may store debug mode content 479, such as debug-related information or commands. After the preparation, the volatile memory 470 may also include other encrypted content 479 not relevant to the debugging, such as shown and described with respect to FIGS. 14, 15, and 16. The content may include at least a part of an encrypted version of crypto key 471, a code of the ACC code 472, NN coefficients, and data 474. Preparation may include encrypting or removing data or commands irrelevant to the debugging from any other location in the integrated circuit, such as in shared caches 492 and 482, in any processing unit, in any hardware accelerator, or in any other location. Following a validation of the debug request and the completion of the preparation, the integrated circuit may participate in the debugging.

FIG. 18 illustrates an example of an integrated circuit 103. As shown in FIG. 18, a debugging circuit and its environment 499 may replace the following units of integrated circuit 401: CPUs 491, CPU's L2 cache" 492, ACU_1 493, ACU_2 473, ACC 481, ACC's L2 cache 482, interconnect 450 and ACU_2 473.

The subject matter may also be implemented in a computer program for running on a computer system, at least including code portions for performing steps of a method according to the subject matter when run on a programmable apparatus, such as a computer system or enabling a programmable apparatus to perform functions of a device or system according to the subject matter. The computer program may cause the storage system to allocate disk drives to disk drive groups.

A computer program is a list of instructions such as a particular application program or an operating system. The computer program may for instance include one or more of: a subroutine, a function, a procedure, an object method, an object implementation, an executable application, an applet, a servlet, a source code, an object code, a shared library/dynamic load library or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as flash memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the subject matter has been described with reference to specific examples of embodiments of the subject matter. It will, however, be evident that various modifications and changes may be made therein without departing from the broader spirit and scope of the subject matter as set forth in the appended claims.

Moreover, the terms "front," "back," "top," "bottom," "over," "under," and the like in the description and in the claims, if any, are used for descriptive purposes and not necessarily for describing permanent relative positions. It is understood that the terms so used are interchangeable under appropriate circumstances such that the embodiments of the subject matter described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "de-assert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

To better illustrate the method and apparatuses disclosed herein, a non-limiting list of example embodiments is provided here.

Example 1 is an integrated circuit for secure debugging, the integrated circuit comprising: a processing unit; an access control unit; and a security unit configured to: determine a debugging enablement, the debugging enablement allowing the secure debugging of the processing unit; and validate a debug request received through a debug port of the integrated circuit, the validation responsive to the determination of the debugging enablement; wherein the access control unit is configured to allow the debugging of the processing unit responsive to the validation; and wherein the integrated circuit is configured to execute the debugging of the processing unit responsive to the allowance of the debugging.

In Example 2, the subject matter of Example 1 optionally includes wherein the validation of the debug request further comprises validating that a debug requestor that generated the debug request is aware of a unique identifier of the processing unit.

In Example 3, the subject matter of any one or more of Examples 1-2 optionally include the security unit further to retrieve boot instructions from a non-volatile memory unit of the integrated circuit, wherein: the boot instructions are retrieved during a boot process; and the determination of the debugging enablement is responsive to the retrieval of the boot instructions.

In Example 4, the subject matter of Example 3 optionally includes wherein: the boot process further comprises decrypting encrypted data stored in a memory unit of the integrated circuit; and the decryption is based on a unique identifier of the processing unit.

In Example 5, the subject matter of Example 4 optionally includes wherein the encrypted data includes debugging instructions.

In Example 6, the subject matter of any one or more of Examples 1-5 optionally include the security unit further configured to generate a debugging determination indicator responsive to the determination of the debugging enablement, wherein the debugging determination indicator is accessible by the access control unit.

In Example 7, the subject matter of Example 6 optionally includes wherein the debugging determination indicator can be changed only by the determination of the debugging enablement.

In Example 8, the subject matter of any one or more of Examples 1-7 optionally include wherein the device is configured to: prepare at least a part of the integrated circuit for the debugging responsive to the determination of the debugging enablement; and allow the debugging of the processing unit further in response to a completion of the preparation.

In Example 9, the subject matter of any one or more of Examples 1-8 optionally include wherein the preparation for the debugging further comprises validating that any program executed by the processing unit and not related to the secure debugging is terminated prior to the secure debugging.

In Example 10, the subject matter of Example 9 optionally includes wherein the preparation for the debugging further comprises erasing any sensitive information from any memory unit accessible to the secure debugging.

In Example 11, the subject matter of any one or more of Examples 1-10 optionally include wherein the debug port includes a Joint Test Action Group (JTAG) compliant debut port.

In Example 12, the subject matter of any one or more of Examples 1-11 optionally include wherein the security unit includes the access control unit.

In Example 13, the subject matter of any one or more of Examples 1-12 optionally include wherein the security unit is separate from the access control unit.

Example 14 is a method for a secure debugging of a processing unit of an integrated circuit, the method comprising: determining a debugging enablement by a security unit of the integrated circuit, the debugging enablement allowing the secure debugging of the processing unit; validating a debug request received through a debug port of the integrated circuit, the validating of the debug request responsive to the determination of the debugging enablement; allowing, by an access control unit of the integrated circuit, the debugging of the processing unit responsive to the validation of the debug request; and executing the debugging of the processing unit responsive to the allowance of the debugging.

In Example 15, the subject matter of Example 14 optionally includes wherein the validation of the debug request further comprises validating that a debug requestor that generated the debug request is aware of a unique identifier of the processing unit.

In Example 16, the subject matter of any one or more of Examples 14-15 optionally include wherein the debug port includes a Joint Test Action Group (JTAG) compliant debut port.

In Example 17, the subject matter of any one or more of Examples 14-16 optionally include retrieving boot instructions by the security unit from a non-volatile memory unit of the integrated circuit, wherein: the boot instructions are retrieved during a boot process; and the determination of the debugging enablement is responsive to the retrieval of the boot instructions.

In Example 18, the subject matter of Example 17 optionally includes wherein: the boot process further comprises decrypting encrypted data stored in a memory unit of the integrated circuit; and the decryption is based on a unique identifier of the processing unit.

In Example 19, the subject matter of Example 18 optionally includes wherein the encrypted data includes debugging instructions.

In Example 20, the subject matter of any one or more of Examples 14-19 optionally include generating a debugging determination indicator responsive to the determination of the debugging enablement, wherein the debugging determination indicator is accessible by the access control unit.

In Example 21, the subject matter of Example 20 optionally includes wherein the debugging determination indicator can be changed only by the determination of the debugging enablement.

In Example 22, the subject matter of any one or more of Examples 14-21 optionally include preparing at least a part of the integrated circuit for the debugging responsive to the determination of the debugging enablement; wherein the allowance of the debugging of the processing unit is further responsive to a completion of the preparation.

In Example 23, the subject matter of Example 22 optionally includes wherein the preparation for the debugging further comprises validating that any program executed by the processing unit and not related to the secure debugging is terminated prior to the secure debugging.

In Example 24, the subject matter of any one or more of Examples 22-23 optionally include wherein the preparation for the debugging further comprises erasing any sensitive information from any memory unit accessible to the secure debugging.

In Example 25, the subject matter of any one or more of Examples 14-24 optionally include wherein the security unit includes the access control unit.

In Example 26, the subject matter of any one or more of Examples 14-25 optionally include wherein the security unit is separate from the access control unit.

Example 27 is at least one non-transitory machine-readable storage medium, comprising a plurality of instructions that, responsive to being executed with processor circuitry of a computer-controlled device, cause the computer-controlled device to: determine a debugging enablement by a security unit of the integrated circuit, the debugging enablement allowing the secure debugging of the processing unit; validate a debug request received through a debug port of the integrated circuit, the validation responsive to the determination of the debugging enablement; allow, by an access control unit of the integrated circuit, the debugging of the processing unit responsive to the validation of the debug request; and execute the debugging of the processing unit responsive to the allowance of the debugging.

In Example 28, the subject matter of Example 27 optionally includes wherein the validation of the debug request further comprises validating that a debug requestor that generated the debug request is aware of a unique identifier of the processing unit.

In Example 29, the subject matter of any one or more of Examples 27-28 optionally include the instructions further causing the computer-controlled device to retrieve boot instructions by the security unit from a non-volatile memory unit of the integrated circuit, wherein: the boot instructions are retrieved during a boot process; and the determination of the debugging enablement is responsive to the retrieval of the boot instructions.

In Example 30, the subject matter of Example 29 optionally includes wherein: the boot process further comprises decrypting encrypted data stored in a memory unit of the integrated circuit; and the decryption is based on a unique identifier of the processing unit.

In Example 31, the subject matter of Example 30 optionally includes wherein the encrypted data includes debugging instructions.

In Example 32, the subject matter of any one or more of Examples 27-31 optionally include the instructions further causing the computer-controlled device to generate a debugging determination indicator responsive to the determination of the debugging enablement, wherein the debugging determination indicator is accessible by the access control unit.

In Example 33, the subject matter of Example 32 optionally includes wherein the debugging determination indicator can be changed only by the determination of the debugging enablement.

In Example 34, the subject matter of any one or more of Examples 27-33 optionally include the instructions further causing the computer-controlled device to prepare at least a part of the integrated circuit for the debugging responsive to the determination of the debugging enablement; wherein the allowance of the debugging of the processing unit is further responsive to a completion of the preparation.

In Example 35, the subject matter of any one or more of Examples 27-34 optionally include wherein the preparation for the debugging further comprises validating that any program executed by the processing unit and not related to the secure debugging is terminated prior to the secure debugging.

In Example 36, the subject matter of Example 35 optionally includes wherein the preparation for the debugging further comprises erasing any sensitive information from any memory unit accessible to the secure debugging.

In Example 37, the subject matter of any one or more of Examples 27-36 optionally include wherein the debug port includes a Joint Test Action Group (JTAG) compliant debut port.

In Example 38, the subject matter of any one or more of Examples 27-37 optionally include wherein the security unit includes the access control unit.

In Example 39, the subject matter of any one or more of Examples 27-38 optionally include wherein the security unit is separate from the access control unit.

The illustrated examples may be implemented as circuitry located on a single integrated circuit or within a same device. Alternatively, the examples may be implemented as any number of separate integrated circuits or separate devices interconnected with each other in a suitable manner. The examples, or portions thereof, may implemented as soft or code representations of physical circuitry or of logical representations convertible into physical circuitry, such as in a hardware description language of any appropriate type.

The subject matter is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems."

Other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to subject matters containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the subject matter have been illustrated and described herein, many modifications, substitutions, changes, and equivalents will now occur to those of ordinary skill in the art. It is, therefore, to be understood that the appended claims are intended to cover all such modifications and changes as fall within the true spirit of the subject matter.

What is claimed is:

1. An integrated circuit for secure debugging, the integrated circuit comprising:
    a processing unit;
    an access control unit; and
    a security unit configured to:
        determine a debugging enablement, the debugging enablement allowing the secure debugging of the processing unit;
        validate a debug request received through a debug port of the integrated circuit, the validation responsive to the determination of the debugging enablement; and
        prepare at least a part of the integrated circuit for the debugging responsive to the determination of the debugging enablement, wherein the preparation for the debugging comprises validating that any program executed by the processing unit and not related to the secure debugging is terminated prior to the secure debugging;
    wherein the access control unit is configured to allow the debugging of the processing unit responsive to the validation and responsive to a completion of the preparation; and
    wherein the integrated circuit is configured to execute the debugging of the processing unit responsive to the allowance of the debugging.

2. The integrated circuit of claim 1, wherein the validation of the debug request further comprises validating that a debug requestor that generated the debug request is aware of a unique identifier of the processing unit.

3. The integrated circuit of claim 1, the security unit further to retrieve boot instructions from a non-volatile memory unit of the integrated circuit, wherein:
    the boot instructions are retrieved during a boot process; and
    the determination of the debugging enablement is responsive to the retrieval of the boot instructions.

4. The integrated circuit of claim 3, wherein:
    the boot process further comprises decrypting encrypted data stored in a memory unit of the integrated circuit; and
    the decryption is based on a unique identifier of the processing unit.

5. The integrated circuit of claim 4, wherein the encrypted data includes debugging instructions.

6. The integrated circuit of claim 1, the security unit further configured to generate a debugging determination indicator responsive to the determination of the debugging enablement, wherein the debugging determination indicator is accessible by the access control unit.

7. The integrated circuit of claim 6, wherein the debugging determination indicator can be changed only by the determination of the debugging enablement.

8. The integrated circuit of claim 1, wherein the preparation for the debugging further comprises erasing any sensitive information from any memory unit accessible to the secure debugging.

9. A method for a secure debugging of a processing unit of an integrated circuit, the method comprising:
    determining a debugging enablement by a security unit of the integrated circuit, the debugging enablement allowing the secure debugging of the processing unit;
    validating a debug request received through a debug port of the integrated circuit, the validating of the debug request responsive to the determination of the debugging enablement;
    preparing at least a part of the integrated circuit for the debugging responsive to the determination of the debugging enablement, wherein the preparation for the debugging further comprises validating that any program executed by the processing unit and not related to the secure debugging is terminated prior to the secure debugging;
    allowing, by an access control unit of the integrated circuit, the debugging of the processing unit responsive to the validation of the debug request and responsive to a completion of the preparation; and
    executing the debugging of the processing unit responsive to the allowance of the debugging.

10. The method of claim 9, wherein the validation of the debug request further comprises validating that a debug requestor that generated the debug request is aware of a unique identifier of the processing unit.

11. The method of claim 9, further comprising retrieving boot instructions by the security unit from a non-volatile memory unit of the integrated circuit, wherein:
    the boot instructions are retrieved during a boot process; and
    the determination of the debugging enablement is responsive to the retrieval of the boot instructions.

12. The method of claim 11, wherein:
    the boot process further comprises decrypting encrypted data stored in a memory unit of the integrated circuit; and
    the decryption is based on a unique identifier of the processing unit.

13. The method of claim 9, further comprising generating a debugging determination indicator responsive to the determination of the debugging enablement, wherein the debugging determination indicator is accessible by the access control unit.

14. At least one non-transitory machine-readable storage medium, comprising a plurality of instructions that, responsive to being executed with processor circuitry of a computer-controlled device, cause the computer-controlled device to:
- determine a debugging enablement by a security unit of an integrated circuit, the debugging enablement allowing the secure debugging of a processing unit;
- validate a debug request received through a debug port of the integrated circuit, the validation responsive to the determination of the debugging enablement;
- prepare at least a part of the integrated circuit for the debugging responsive to the determination of the debugging enablement, wherein the preparation for the debugging further comprises validating that any program executed by the processing unit and not related to the secure debugging is terminated prior to the secure debugging;
- allow, by an access control unit of the integrated circuit, the debugging of the processing unit responsive to the validation of the debug request and responsive to a completion of the preparation; and
- execute the debugging of the processing unit responsive to the allowance of the debugging.

15. The non-transitory machine-readable storage medium of claim 14, wherein the validation of the debug request further comprises validating that a debug requestor that generated the debug request is aware of a unique identifier of the processing unit.

16. The non-transitory machine-readable storage medium of claim 14, the instructions further causing the computer-controlled device to retrieve boot instructions by the security unit from a non-volatile memory unit of the integrated circuit, wherein:
- the boot instructions are retrieved during a boot process; and
- the determination of the debugging enablement is responsive to the retrieval of the boot instructions.

17. The non-transitory machine-readable storage medium of claim 16, wherein:
- the boot process further comprises decrypting encrypted data stored in a memory unit of the integrated circuit; and
- the decryption is based on a unique identifier of the processing unit.

18. The non-transitory machine-readable storage medium of claim 17, wherein the encrypted data includes debugging instructions.

19. The non-transitory machine-readable storage medium of claim 14, the instructions further causing the computer-controlled device to generate a debugging determination indicator responsive to the determination of the debugging enablement, wherein the debugging determination indicator is accessible by the access control unit.

20. The non-transitory machine-readable storage medium of claim 19, wherein the debugging determination indicator can be changed only by the determination of the debugging enablement.

21. The non-transitory machine-readable storage medium of claim 14, wherein the preparation for the debugging further comprises erasing any sensitive information from any memory unit accessible to the secure debugging.

* * * * *